United States Patent
Fay, II

(10) Patent No.: US 10,421,484 B2
(45) Date of Patent: Sep. 24, 2019

(54) REAR AXLE STEERING SYSTEM AND METHODS OF USING THE SAME

(71) Applicant: CNH Industrial America, LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 141 days.

(21) Appl. No.: 15/639,606

(22) Filed: Jun. 30, 2017

(65) Prior Publication Data
US 2019/0002017 A1 Jan. 3, 2019

(51) Int. Cl.
| | |
|---|---|
| B62D 5/06 | (2006.01) |
| B62D 7/10 | (2006.01) |
| B62D 7/22 | (2006.01) |
| B62D 5/065 | (2006.01) |
| B62D 7/16 | (2006.01) |
| B62D 5/12 | (2006.01) |
| B62D 5/26 | (2006.01) |
| B62D 7/06 | (2006.01) |
| B62D 9/00 | (2006.01) |
| B62D 11/24 | (2006.01) |
| B60B 33/00 | (2006.01) |

(52) U.S. Cl.
CPC ............ *B62D 5/061* (2013.01); *B60B 33/00* (2013.01); *B62D 5/065* (2013.01); *B62D 5/12* (2013.01); *B62D 5/26* (2013.01); *B62D 7/06* (2013.01); *B62D 7/10* (2013.01); *B62D 7/166* (2013.01); *B62D 7/226* (2013.01); *B62D 9/00* (2013.01); *B62D 11/24* (2013.01)

(58) Field of Classification Search
CPC .......... B62D 5/061; B62D 7/06; B62D 11/24; B62D 9/00; B62D 5/26; B62D 5/12; B62D 7/166; B62D 5/065; B62D 7/226; B62D 7/10; B60B 33/00
USPC ......................................................... 180/421
See application file for complete search history.

(56) References Cited

U.S. PATENT DOCUMENTS

| | | | |
|---|---|---|---|
| 5,244,226 A * | 9/1993 | Bergh | B62D 13/04 |
| | | | 280/426 |
| 7,077,220 B2 | 7/2006 | Dunn et al. | |
| 7,866,680 B2 | 1/2011 | Baldauf et al. | |
| 8,020,648 B2 | 9/2011 | Otto | |
| 8,733,770 B2 | 5/2014 | Nafziger et al. | |
| 8,893,831 B2 | 11/2014 | Otto | |
| 9,101,090 B2 | 8/2015 | Pierce et al. | |
| 2015/0223386 A1 | 8/2015 | Nafziger et al. | |
| 2019/0124820 A1* | 5/2019 | Dockter | A01B 69/007 |

* cited by examiner

*Primary Examiner* — Joseph M Rocca
*Assistant Examiner* — Felicia L. Brittman
(74) *Attorney, Agent, or Firm* — Peter K. Zacharias; Patrick M. Sheldrake

(57) ABSTRACT

The disclosure relates to a steering system useful for providing stable control during rear axle steering of harvesters, such as self-propelled windrowers. The steering system utilizes a single steering cylinder and retracted caster cylinders to regulate rotation of the casters during rear axle road operation mode. The steering system locks the steering cylinder and uses the caster cylinders for damping during in-field operation mode.

21 Claims, 26 Drawing Sheets

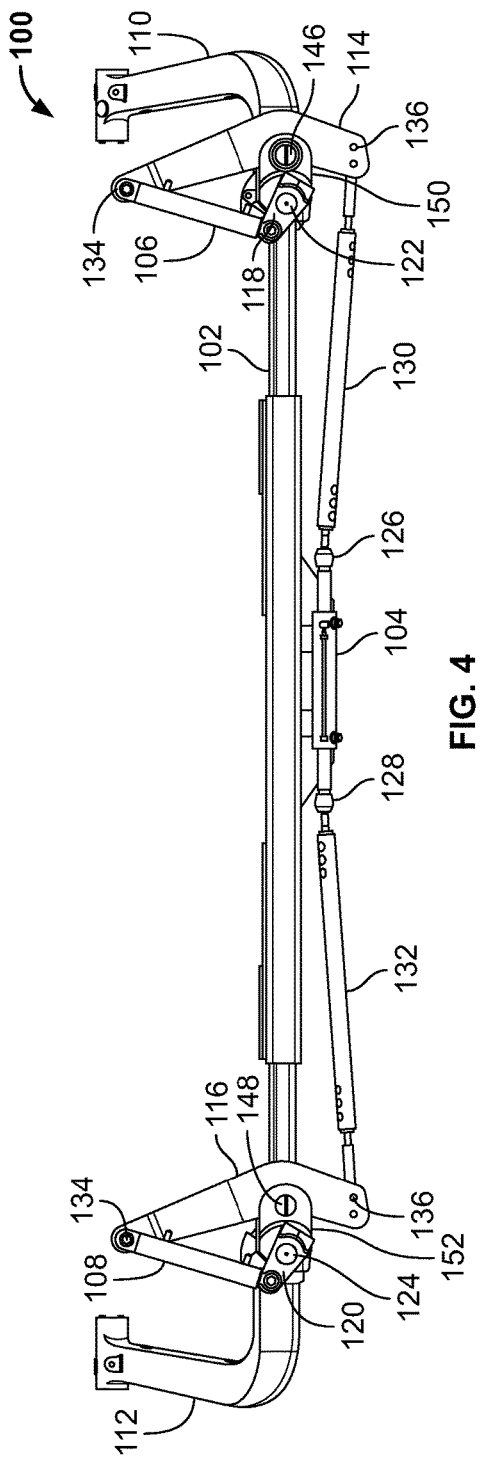
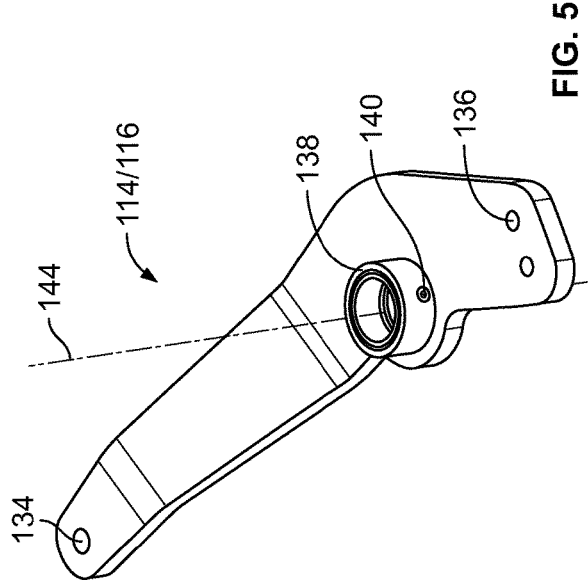
FIG. 4
FIG. 5

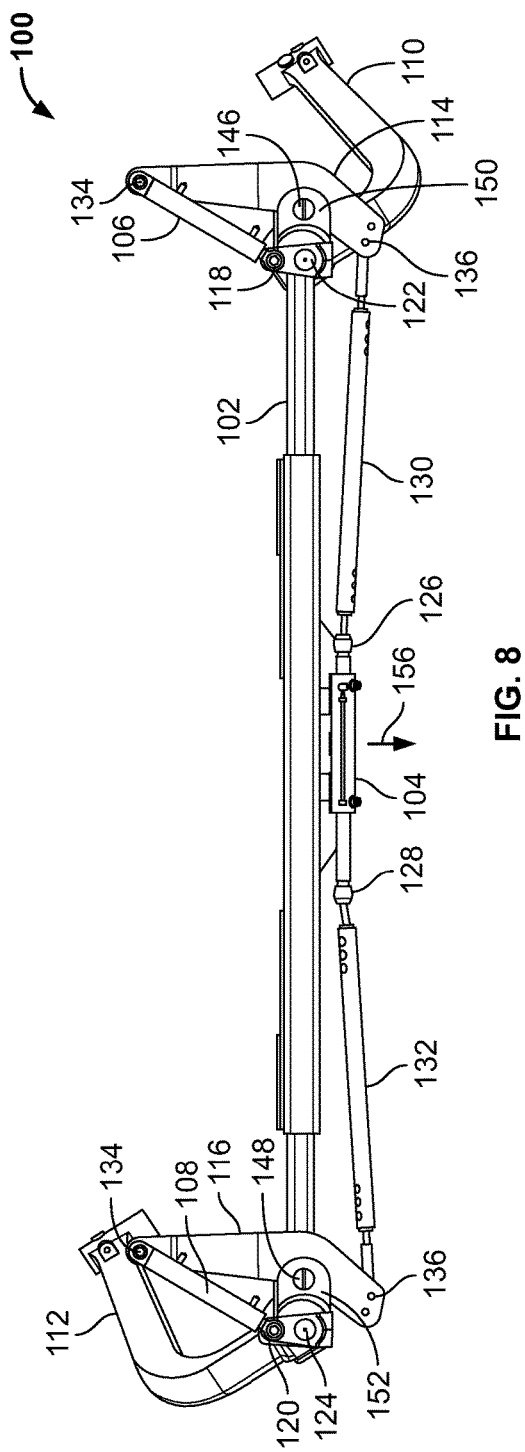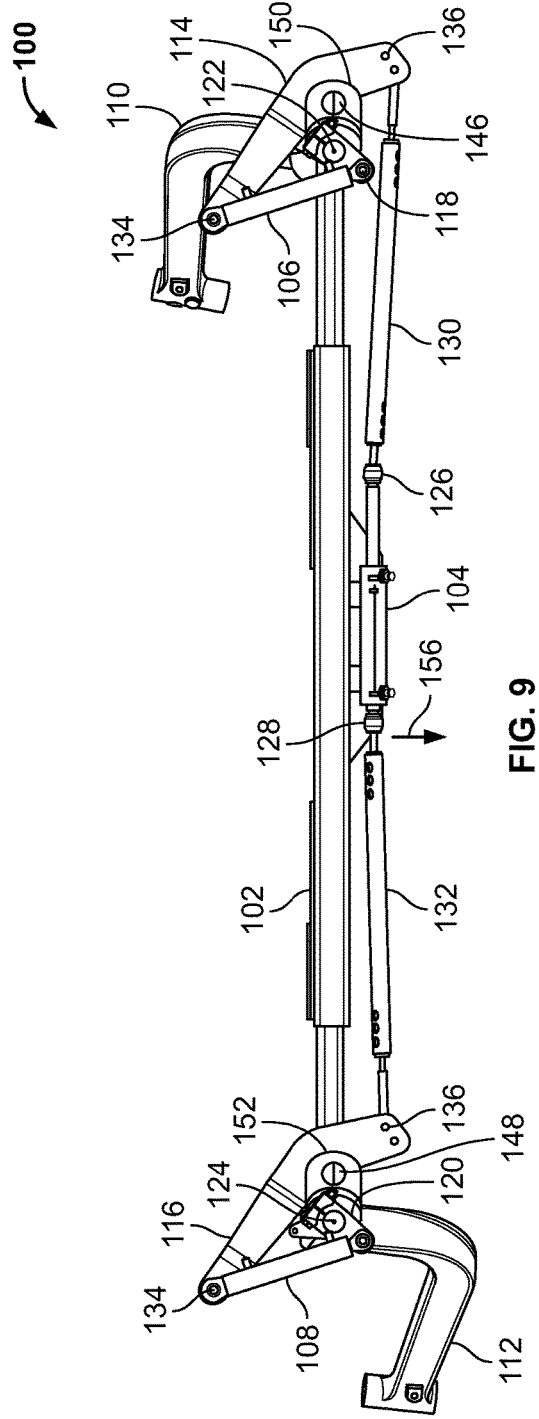
FIG. 8
FIG. 9

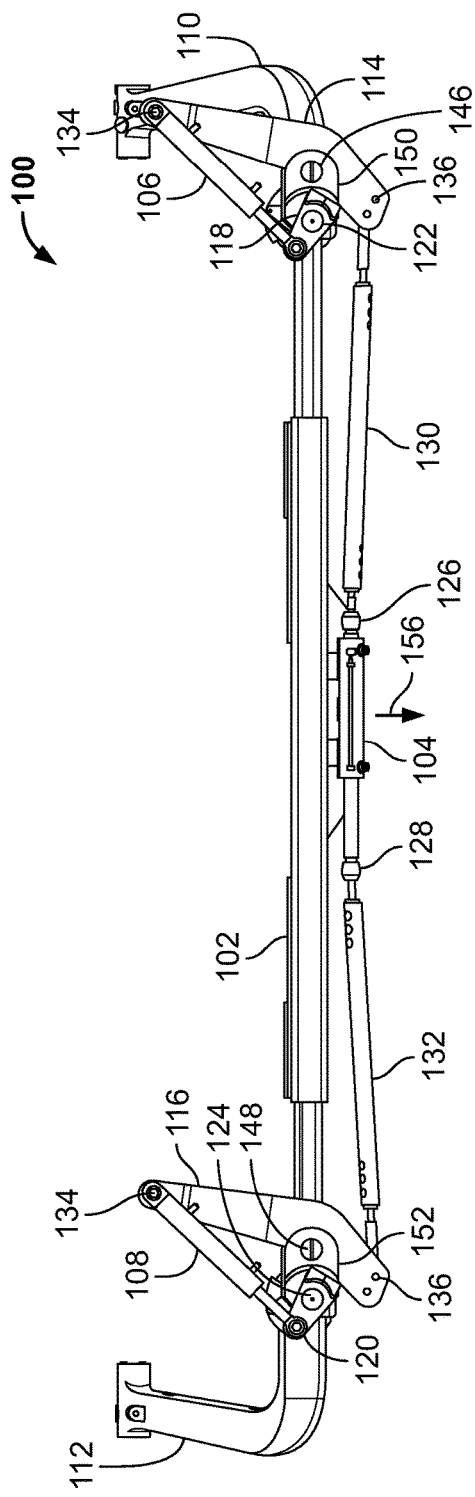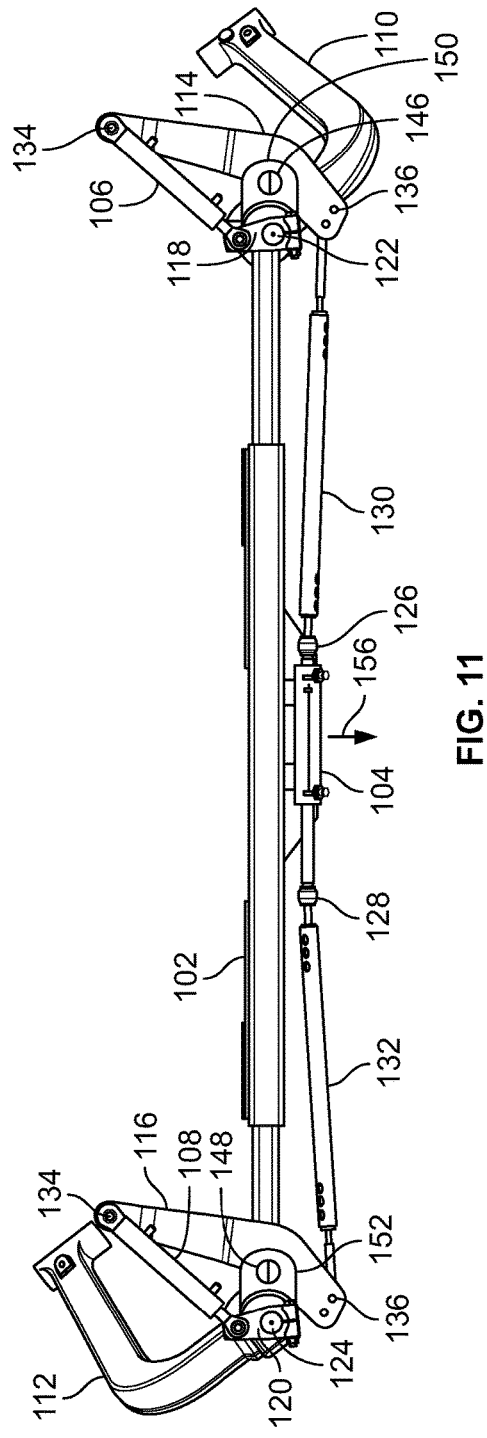

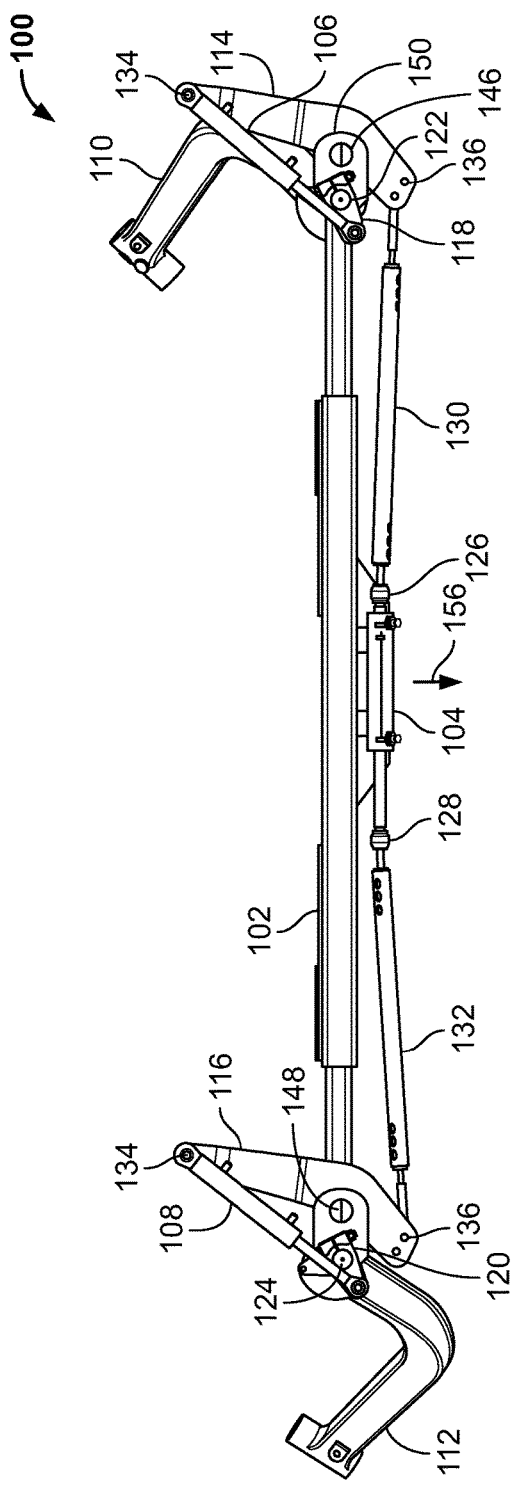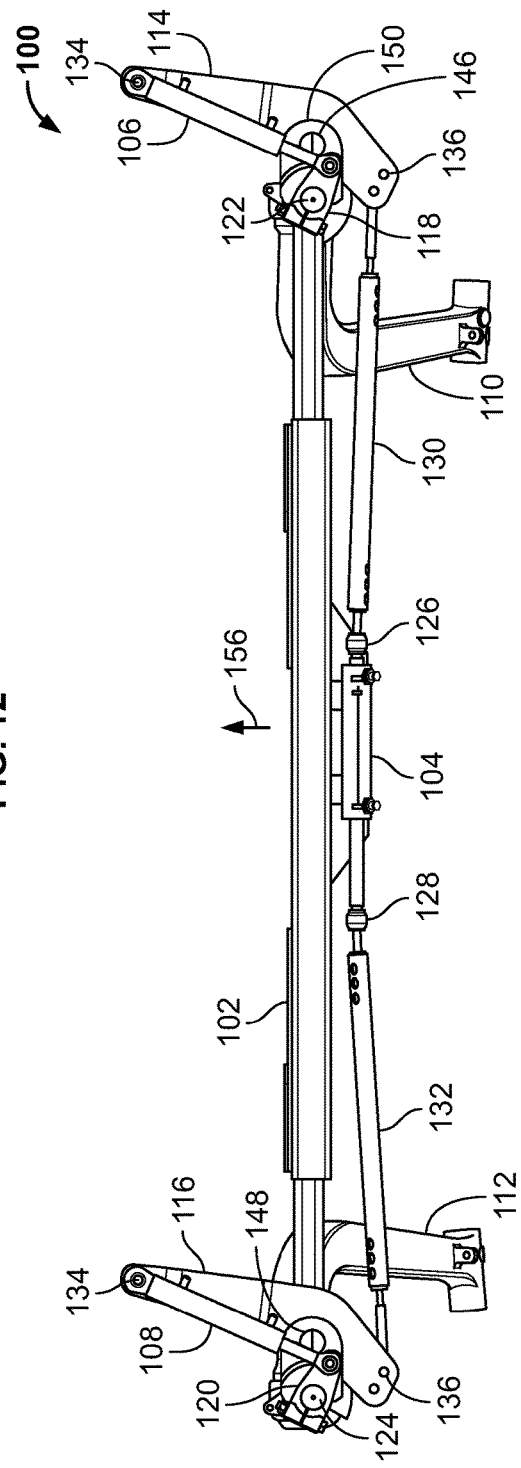
FIG. 12
FIG. 13

REAR AXLE STEERING SYSTEM AND METHODS OF USING THE SAME

BACKGROUND

Harvesters such as windrowers, tractors, and forage harvesters, have to operate effectively in normal and high-speed modes. Typical construction for such vehicles include front ground wheels mounted on the frame at fixed angles parallel to each other and parallel to a center line of the frame and rear ground wheels mounted on a respective caster. Each of the front ground wheels is typically driven by a respective drive motor which allows variable speed in both the forward and reverse directions such that steering of the tractor is effected by a differential in speed between the front wheels with the rear wheels following the steering in a castering action.

Conventional harvesters generally use dual path steering for both in-field operation mode and high-speed road transport operation mode. Dual path steering generally operates by varying the speed of the two front drive wheels in order to steer the harvester. The left wheel slows while the right wheel speeds up to turn left, while the right wheel slows and the left wheel speeds up to turn right. Combined with passively castering rear wheels, this enables the conventional harvester to perform zero radius spin turns in the field, which is desirable for optimum field efficiency and maneuverability. However, during high-speed road transport operation mode (e.g., at speeds up to 24.5 mph) dual path steering does not provide adequate steering stability. This is due to several factors, including variable ground drive motor/pump efficiency, lack of steering feedback to the driver, dynamics of the harvester which uses the front wheels to steer with no stabilizing effect provided by the rear wheels, combinations thereof, or the like.

FIGS. 1 and 2 show perspective and detailed views of a conventional windrower 10. The windrower 10 generally includes front wheels 12, 14 rotatably mounted to a frame 16, and a damping system 18 mounted to a rear axle 20 of the frame 16. The windrower 10 includes a cabin 22 configured and dimensioned to receive an operator, and having a plurality of controls for operation of the windrower 10, such as controlling a header (not shown) attachable to the front 24 of the windrower 10, controlling movement of the windrower in a forward direction 26, and controlling movement of the windrower in a reverse direction 28. The windrower 10 uses a mechanical hydraulic steering valve for steering the windrower 10.

At the rear 30, the windrower 10 includes casters 32, 34 rotatably mounted on opposing sides of the frame 16. The windrower 10 includes two independent caster wheels 36, 38 mounted to the respective casters 32, 34, one on the left-hand side and one on the right-hand side of the windrower 10. The casters 32, 34 are damped by horizontally mounted passive dampers 40, 42 (e.g., shock absorbers). The dampers 40, 42 mount at their base to arms 46, 47 mounted rigidly to the vehicle axis or axle 20. The rod end of the damper 40, 42 is mounted to a second arm 44, 45, which mounts rigidly to and rotates with the caster upright shaft 48, 50 (e.g., axis). Such mounting causes extension and retraction of the damper 40, 42 which, in turn, damps the oscillation of the caster wheel 36, 38.

As noted above, during high-speed road transport operation mode, the dual path steering does not provide adequate steering stability. Particularly, the rear wheels 36, 38 passively caster during high speed operation with all steering accomplished by varying the speed of the front ground drive wheels, and no directional stability is provided by the rear wheels 36, 38. The tendency for the rear wheels 36, 38 to shimmy during high speed operation necessitates the damping system 18 for the caster wheels 36, 38. The damping system 36, 38 uses a form of friction or viscous damper 40, 42 which can affect the directional stability due to the damping force not allowing the wheel 36, 38 to change direction as quickly as desired for turns. While shimmying is most pronounced during high speed road operation, it can also occur during field operation mode, which necessitates that any rear steering system also provide adequate caster shimmy damping for field speeds (e.g., up to 15 mph).

SUMMARY

The disclosure relates to a steering system for a harvester that provides for stable operation during rear axle steering (e.g., road operation mode). The steering system includes a single steering cylinder and caster cylinders. During road operation mode, the caster cylinders are locked in a retracted position and the steering cylinder is used to regulate rotation of the casters. During in-field operation mode, the steering cylinder is locked in a home position and the caster cylinders are used to dampen rotation of the casters, thereby providing stable operation of the casters and anti-shimmying.

In accordance with some embodiments of the present disclosure, an exemplary steering system for a harvester is provided. The steering system includes a single steering cylinder configured to be mounted to a rear axle of the harvester, the steering cylinder including first and second opposing ends. The steering system includes a right-hand side steering arm rotatably coupled at one end to a right-hand side caster cylinder, and rotatably coupled at an opposing end to a first tie rod, the first tie rod coupling the right-hand side steering arm with the first end of the steering cylinder, and the right-hand side caster cylinder coupling the right-hand side steering arm to a pivot shaft of a right-hand side caster. The steering system includes a left-hand side steering arm rotatably coupled at one end to a left-hand side caster cylinder, and rotatably coupled at an opposing end to a second tie rod, the second tie rod coupling the left-hand side steering arm with the second end of the steering cylinder, and the left-hand side caster cylinder coupling the left-hand side steering arm to a pivot shaft of a left-hand side caster. When the steering system is actuated into a road operation mode, the left and right-hand side cylinders are actuated to retract and lock in a retracted position, and actuation of the steering cylinder regulates rotation of the left and right-hand side casters.

The right-hand side steering arm pivots about a shaft coupled to a mounting bracket extending from the pivot shaft of the right-hand side caster. An axis of rotation of the pivot point of the right-hand side steering arm is offset from an axis of rotation of the pivot shaft of the right-hand side caster. The right-hand side caster cylinder is rotatably coupled to the pivot shaft of the right-hand side caster with a crank arm. In the road operation mode, the left and right-hand side cylinders operate as rigid steering links receiving actuation from the steering cylinder. In the road operation mode, extension of the steering cylinder is limited to an amount below a full extension position in the home direction.

When the steering system is actuated into an in-field operation mode, the steering cylinder is actuated to retract and lock in a retracted home position, and the left and right-hand side caster cylinders are actuated to open to tank. In the in-field operation mode, the left and right-hand side casters freely pivot with shimmy damping provided by the left and right-hand side caster cylinders.

The steering cylinder is centrally mounted to the rear axle of the harvester. The left and right-hand side steering arms are L-shaped or boomerang-shaped. The steering system includes a proximity sensor configured to detect a position of at least one of the left-hand side caster or the right-hand side caster relative to the rear axle. The proximity sensor includes a fixedly mounted sensing element and a sensor plate rotatable with the left-hand side caster or the right-hand side caster. The sensing element is a magnetic element configured to detect a proximity of the sensor plate.

In accordance with embodiments of the present disclosure, an exemplary harvester is provided. The harvester includes a frame, at least one front axle including first and second front wheels pivotally mounted to the front axle, at least one rear axle including right-hand and left-hand casters pivotally mounted to the rear axle, and a steering system. The steering system includes a single steering cylinder configured to be mounted to the rear axle of the harvester, the steering cylinder including first and second opposing ends. The steering system includes a right-hand side steering arm rotatably coupled at one end to a right-hand side caster cylinder, and rotatably coupled at an opposing end to a first tie rod, the first tie rod coupling the right-hand side steering arm with the first end of the steering cylinder, and the right-hand side caster cylinder coupling the right-hand side steering arm to a pivot shaft of the right-hand side caster. The steering system includes a left-hand side steering arm rotatably coupled at one end to a left-hand side caster cylinder, and rotatably coupled at an opposing end to a second tie rod, the second tie rod coupling the left-hand side steering arm with the second end of the steering cylinder, and the left-hand side caster cylinder coupling the left-hand side steering arm to a pivot shaft of the left-hand side caster. When the steering system is actuated into a road operation mode, the left and right-hand side cylinders are actuated to retract and lock in a retracted position, and actuation of the steering cylinder regulates rotation of the left and right-hand side casters.

The right-hand side steering arm pivots about a shaft coupled to a mounting bracket extending from the pivot shaft of the right-hand side caster. An axis of rotation of the pivot point of the right-hand side steering arm is offset from an axis of rotation of the pivot shaft of the right-hand side caster. In some embodiments, in the road operation mode, the left and right-hand side cylinders operate as rigid steering links receiving actuation from the steering cylinder. In some embodiments, in the road operation mode, extension of the steering cylinder is limited to an amount below a full extension position in the home direction.

When the steering system is actuated into an in-field operation mode, the steering cylinder is actuated to retract and lock in a retracted home position, and the left and right-hand side cylinders are actuated to open to tank. In the in-field operation mode, the left and right-hand side casters freely pivot with shimmy damping provided by the left and right-hand side cylinders. The steering system includes a proximity sensor configured to detect a position of at least one of the left-hand side caster or the right-hand side caster relative to the rear axle.

In accordance with embodiments of the present disclosure, an exemplary method of steering a harvester is provided. The method includes actuating a steering system of the harvester into a rear axle steering operation mode. The steering system includes a single steering cylinder configured to be mounted to a rear axle of the harvester, the steering cylinder including first and second opposing ends. The steering system includes a right-hand side steering arm rotatably coupled at one end to a right-hand side caster cylinder, and rotatably coupled at an opposing end to a first tie rod, the first tie rod coupling the right-hand side steering arm with the first end of the steering cylinder, and the right-hand side caster cylinder coupling the right-hand side steering arm to a pivot shaft of a right-hand side caster. The steering system includes a left-hand side steering arm rotatably coupled at one end to a left-hand side caster cylinder, and rotatably coupled at an opposing end to a second tie rod, the second tie rod coupling the left-hand side steering arm with the second end of the steering cylinder, and the left-hand side caster cylinder coupling the left-hand side steering arm to a pivot shaft of a left-hand side caster. The method includes actuating the left and right-hand side cylinders to retract into a retracted position. The method includes locking the left and right-hand side cylinders in the retracted position. The method includes actuating the steering cylinder to regulate rotation of the left and right-hand side casters.

The method includes operating the left and right-hand side cylinders as rigid steering links receiving actuation from the steering cylinder in the road operation mode. The method includes limiting extension of the steering cylinder to an amount below a full extension position in the road operation mode in the home direction. The method includes actuating the steering system into an in-field operation mode to retracting and locking the steering cylinder in a retracted position, and actuating the left and right-hand side cylinders to open to tank. The method includes detecting a position of at least one of the left-hand side or right-hand side caster relative to the rear axle with a proximity sensor.

In accordance with embodiments of the present disclosure, an exemplary steering system for a harvester is provided. The steering system includes a single steering cylinder configured to be mounted to a rear axle of the harvester at a first end, and pivotally coupled to a rocker arm at an opposing second end. The steering system includes a first tie rod pivotally coupled to the rocker arm at one end and pivotally coupled to a right-hand side cylinder at an opposing end, the right-hand side caster cylinder pivotally coupled to a pivot shaft of a right-hand side caster. The steering system includes a second tie rod pivotally coupled to the rocker arm at one end and pivotally coupled to a left-hand side cylinder at an opposing end, the left-hand side caster cylinder pivotally coupled to a pivot shaft of a left-hand side caster. When the steering system is actuated into a road operation mode, the steering cylinder is actuated to open to tank, and the right and left-hand side cylinders are actuated to retract and lock in a retracted position, actuation of the steering cylinder regulating rotation of the right and left-hand side casters.

The steering cylinder is at least one of a hydraulic cylinder, an electric cylinder, or a pneumatic cylinder. The steering system includes a respective bracket rigidly mounted to the pivot shaft of the right-hand and/or left-hand side caster, and an idler arm pivotally coupled to the bracket. The steering system includes a proximity sensor configured to detect a position of at least one of the left-hand side caster or the right-hand side caster relative to the rear axle. When the steering system is actuated into an in-field operation mode, the steering cylinder is actuated in a retracted position, and the right and left-hand side cylinders are actuated to open to tank allowing the right and left-hand side casters to pivot freely.

In accordance with embodiments of the present disclosure, an exemplary harvester is provided. The harvester includes a frame, at least one front axle including first and second front wheels pivotally mounted to the front axle, at least one rear axle including right-hand and left-hand casters pivotally mounted to the rear axle, and a steering system. The steering system includes a single steering cylinder configured to be mounted to the rear axle of the harvester at a first end, and pivotally coupled to a rocker arm at an opposing second end. The steering system includes a first tie rod pivotally coupled to the rocker arm at one end and pivotally coupled to a right-hand side cylinder at an opposing end, the right-hand side caster cylinder pivotally coupled to a pivot shaft of the right-hand side caster. The steering system includes a second tie rod pivotally coupled to the rocker arm at one end and pivotally coupled to a left-hand side cylinder at an opposing end, the left-hand side caster cylinder pivotally coupled to a pivot shaft of the left-hand side caster. When the steering system is actuated into a road operation mode, the steering cylinder is actuated to open to tank, and the right and left-hand side cylinders are actuated to retract and lock in a retracted position, actuation of the steering cylinder regulating rotation of the right and left-hand side casters.

In accordance with embodiments of the present disclosure, an exemplary method of steering a harvester is provided. The method includes actuating a steering system of the harvester into a rear axle steering operation mode. The steering system includes a single steering cylinder configured to be mounted to the rear axle of the harvester at a first end, and pivotally coupled to a rocker arm at an opposing second end. The steering system includes a first tie rod pivotally coupled to the rocker arm at one end and pivotally coupled to a right-hand side cylinder at an opposing end, the right-hand side caster cylinder pivotally coupled to a pivot shaft of the right-hand side caster. The steering system includes a second tie rod pivotally coupled to the rocker arm at one end and pivotally coupled to a left-hand side cylinder at an opposing end, the left-hand side caster cylinder pivotally coupled to a pivot shaft of the left-hand side caster. The method includes actuating the steering cylinder to open to tank. The method includes actuating the right and left-hand side cylinders in a retracted position. The method includes locking the right and left-hand side cylinders in the retracted position. The method includes actuating the steering cylinder to regulate rotation of the right and left-hand side casters.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed rear axle steering systems, reference is made to the accompanying figures, wherein:

FIG. 4 is a top view of an exemplary rear axle steering system of the present disclosure;
FIG. 5 is a perspective view of a steering arm of an exemplary rear axle steering system of the present disclosure;
FIG. 8 is a top view of an exemplary rear axle steering system of the present disclosure in a left turn operation for high speed road transport steering;
FIG. 9 is a top view of an exemplary rear axle steering system of the present disclosure in a right turn operation for high speed road transport steering;
FIG. 10 is a top view of an exemplary rear axle steering system of the present disclosure in a neutral operation for in-field dual path steering;
FIG. 11 is a top view of an exemplary rear axle steering system of the present disclosure in a left turn operation for in-field dual path steering;
FIG. 12 is a top view of an exemplary rear axle steering system of the present disclosure in a right turn operation for in-field dual path steering;
FIG. 13 is a top view of an exemplary rear axle steering system of the present disclosure in a reversing operation for in-field dual path steering.

DETAILED DESCRIPTION

Figure 1:
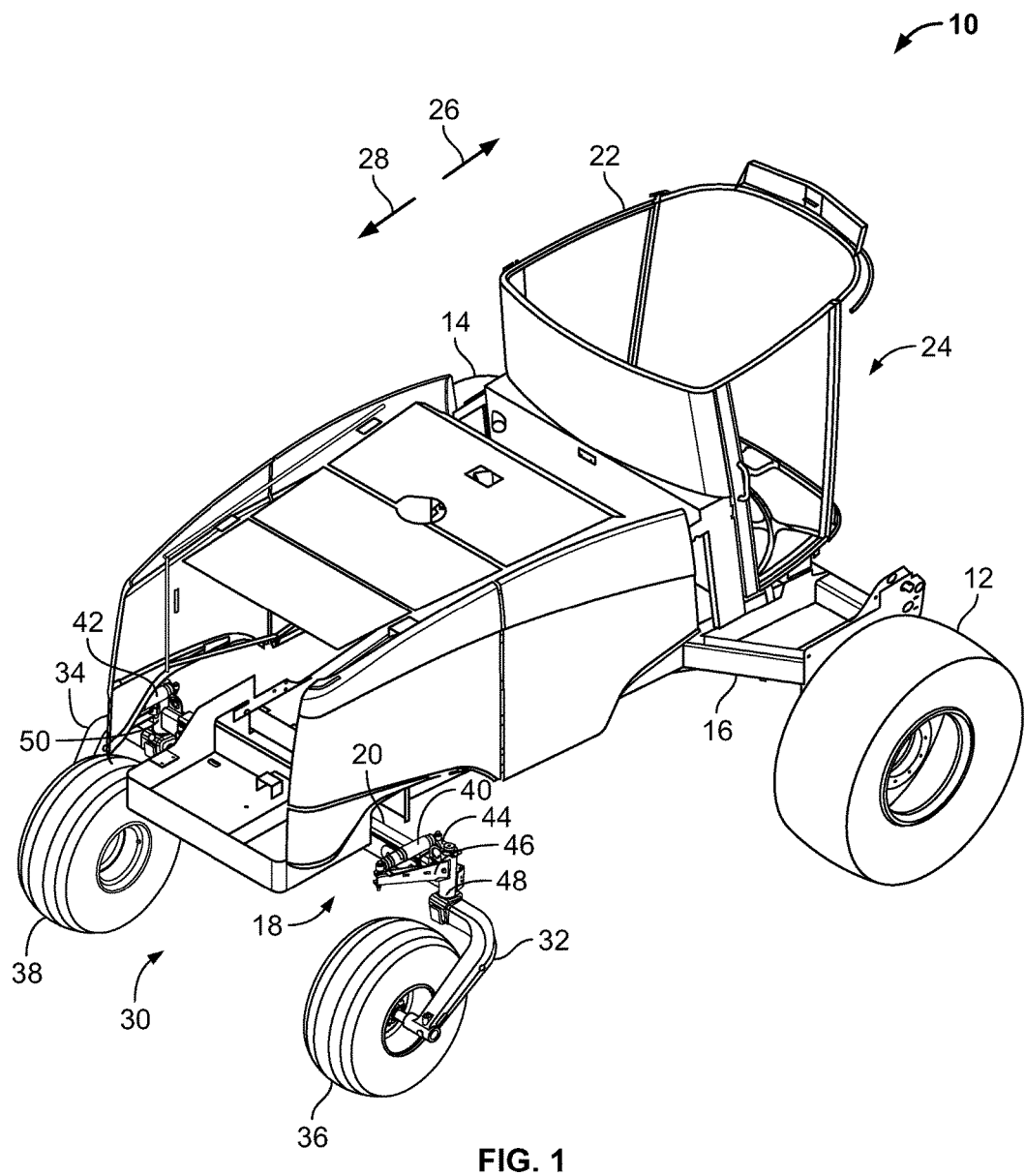
FIG. 1 is a perspective view of a conventional windrower.
Figure 2:
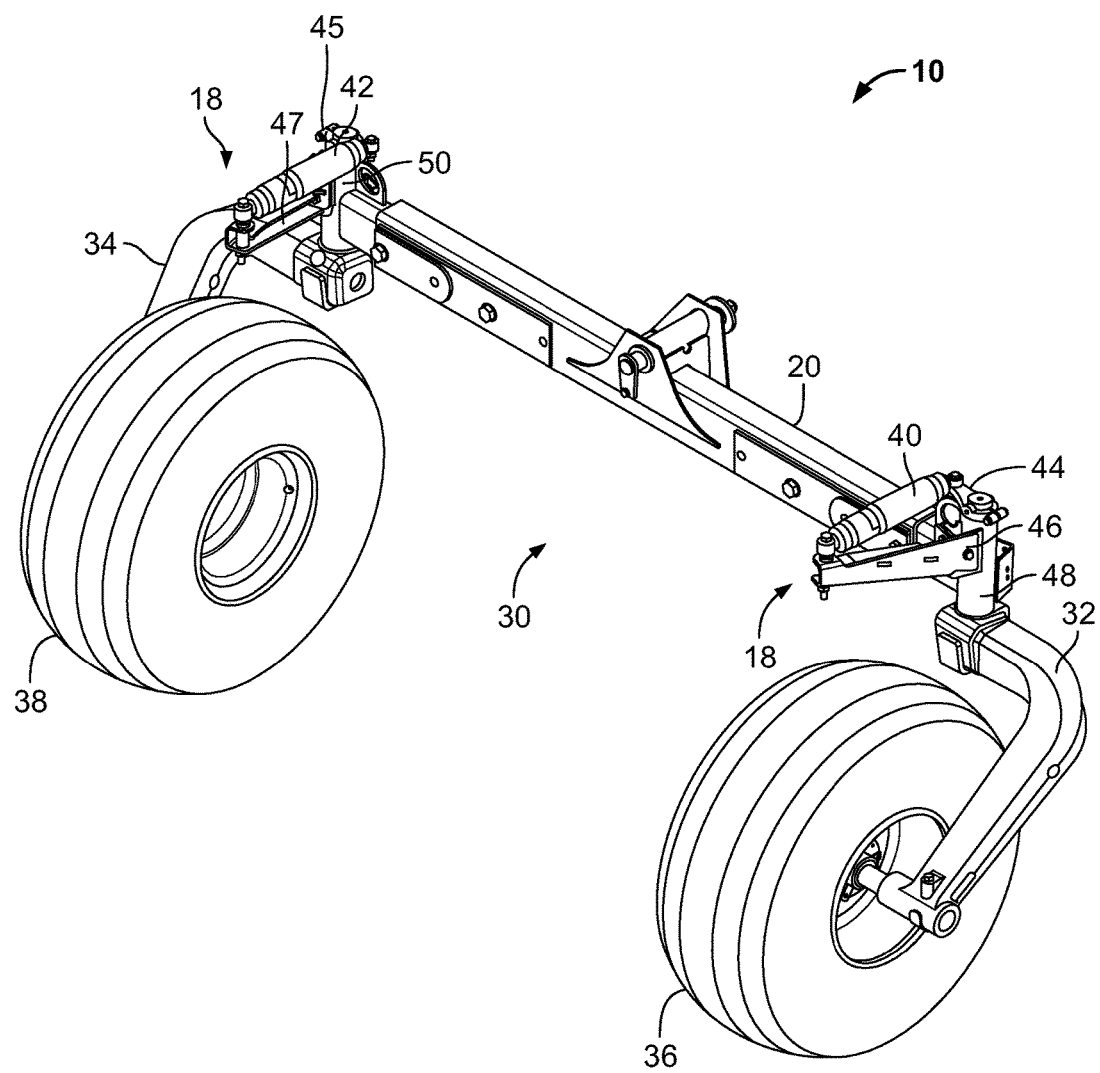
FIG. 2 is a detailed perspective view of a damping system of a conventional windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" or "steering system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator steering of the harvester. In some embodiments, the disclosure also relates to a computer software product with executable code that automatically toggles between or through different hydraulic states based on operator steering of the harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about steering of the harvester. In some embodiments, the system includes one or a plurality of sensors to detect the steering selected by the operator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the steering of the harvester. In some embodiments, the system may be configured by the operator to transition the harvester between different hydraulic states in synchrony or substantial synchrony to operator-initiated steering of the harvester. In some embodiments, the data processing system of the harvester transitions the harvester between different hydraulic states in synchrony or substantial synchrony to operator-initiated steering of the harvester depending upon real-time information sent to a controller by a sensor that monitors the steering wheel actuation.

The term "real-time" and the phrase "in real-time" as used herein are defined as a way of describing a process, event, or action that occurs simultaneously with the process of actively operating a harvester. In some embodiments, various sensors continuously sense information about the steering operation of the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a self-propelled windrower, a forage harvester, cotton harvester or a lawn mower. Embodiments of the present disclosure are particularly well suited, but in no way limited to, use with any vehicle with a front and rear steer system.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers. The sensors for the steering system can be configured to sense the proximity of the rear casters with respect to the rear axle to determine whether or not the casters are in a position where the rear axle steering system can be activated (rear wheels essentially behind the rear axle), otherwise activating the rear axle steering could result in the rear wheels not being properly aligned for steering operation (not pointing in the correct direction). In some embodiments, additional sensors can be used to determine that the caster cylinders are fully retracted. In some embodiments, such sensors can be proximity sensors that sense a target and allow the system to continue to function, whereas if the target is not being sensed, the system can either retract the caster cylinder back to its fully retracted position or deactivate the rear axle steering system due to a failure. If a proximity sensor is not used for the caster cylinders, a pressure transducer or switch can be used in the rod end of the cylinder to determine that a set-point pressure has been reached and is being maintained during rear axle steering operation. Should this set-point pressure not be maintained, the system can either retract the cylinder to restore the rod end pressure or deactivate rear axle steering.

FIGS. 4-7 show perspective, top and detailed views of an exemplary rear wheel steering system 100 (hereinafter "system 100") of the present disclosure. The exemplary selectable rear wheel steering system 100 is mounted to one or more rear axles 102 of a windrower using a single centrally mounted position sensing steering cylinder 104, two non-position sensing caster cylinders 106, 108 as dampers for casters 110, 112 and rigid steering links, and non-concentrically mounted pivotal steering arms 114, 116. Hydraulic cylinders, also referred to herein as caster cylinders 106, 108, can be used in place of conventional passive dampers. The steering system 100 can use an electronic steering sensor that provides an electrical output of the steering wheel position in order to provide rear axle steering position control.

The exemplary steering system 100 includes two steering arms 114, 116 that are pivotally mounted to the axle 102 of the windrower. Both steering arms 114, 116 are mounted to either the right or left-hand side of the rear axle casters 110, 112. The caster cylinders 106, 108 are mounted at their base/barrel end to one end of the steering arm 114, 116, while the rod end mounts to a crank arm 118, 120 mounted rigidly to the top of the rear wheel caster vertical pivot shaft 122, 124. The single centrally mounted steering cylinder 104 is mechanically coupled to the axle 102. Opposing ends 126, 128 of the steering cylinder 104 are mechanically coupled to tie rods 130, 132. The tie rods 130, 132 are mechanically coupled to the ends of the steering arms 114, 116 opposing the coupling end with the caster cylinders 106, 108. The tie rods 130, 132 are each adjustable in length, such adjustment allowing for adjustable rear track width of the windrower.

In particular, as shown in FIG. 5, the steering arms 114, 116 define substantially boomerang or L-shaped configurations. Each steering arm 114, 116 includes one endpoint with a coupling and pivot point 134 for rotatably coupling with the caster cylinders 106, 108. Each steering arm 114, 116 further includes an opposing endpoint with a coupling and pivot point 136 for rotatably coupling with the tie rods 130, 132. Between the points 134, 136 and near or at the point of curvature in the steering arm 114, 116, the steering arm 114, 116 includes an opening 138 configured and dimensioned to receive a pivot shaft 146, 148 (e.g., coupling being achieved with a locking mechanism, such as set screw 140).

The system 100 includes a mounting bracket 150, 152 extending from the pivot shafts 122, 124. The steering arms 114, 116 fit between the two extensions of the respective mounting brackets 150, 152 and pivotally couple to the mounting brackets 150, 152 with the pivot shaft 146, 148. Due to the curvature of the steering arm 114, 116, the pivot axis 142 of the pivot shaft 122, 124 for the casters 110, 112 is offset or non-concentric relative to the pivot axis 144 for the steering arm 114, 116 at the pivot shaft 146, 148.

Figure 6:
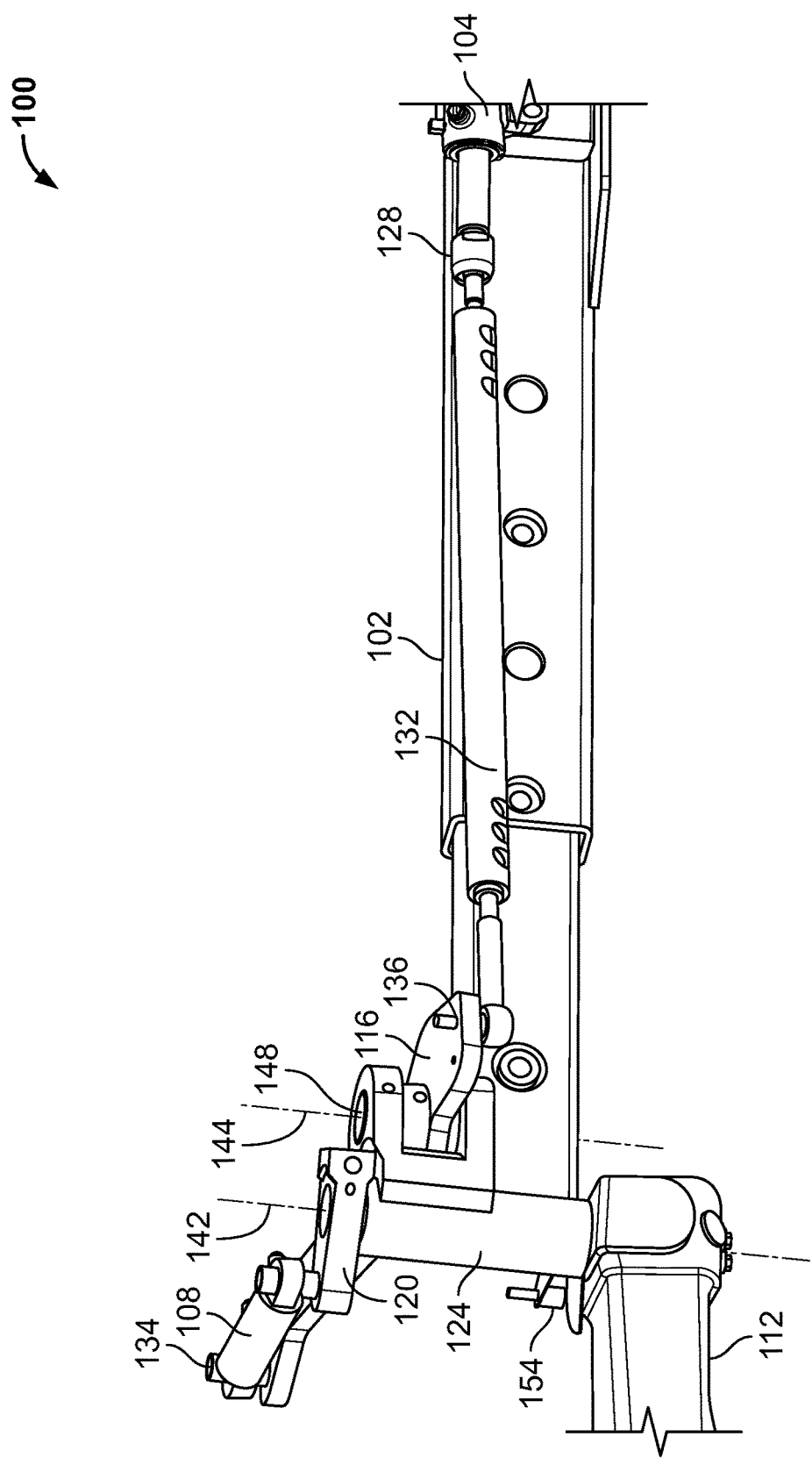
FIG. 6 is a detailed view of an exemplary rear axle steering system of the present disclosure.
Figure 7:
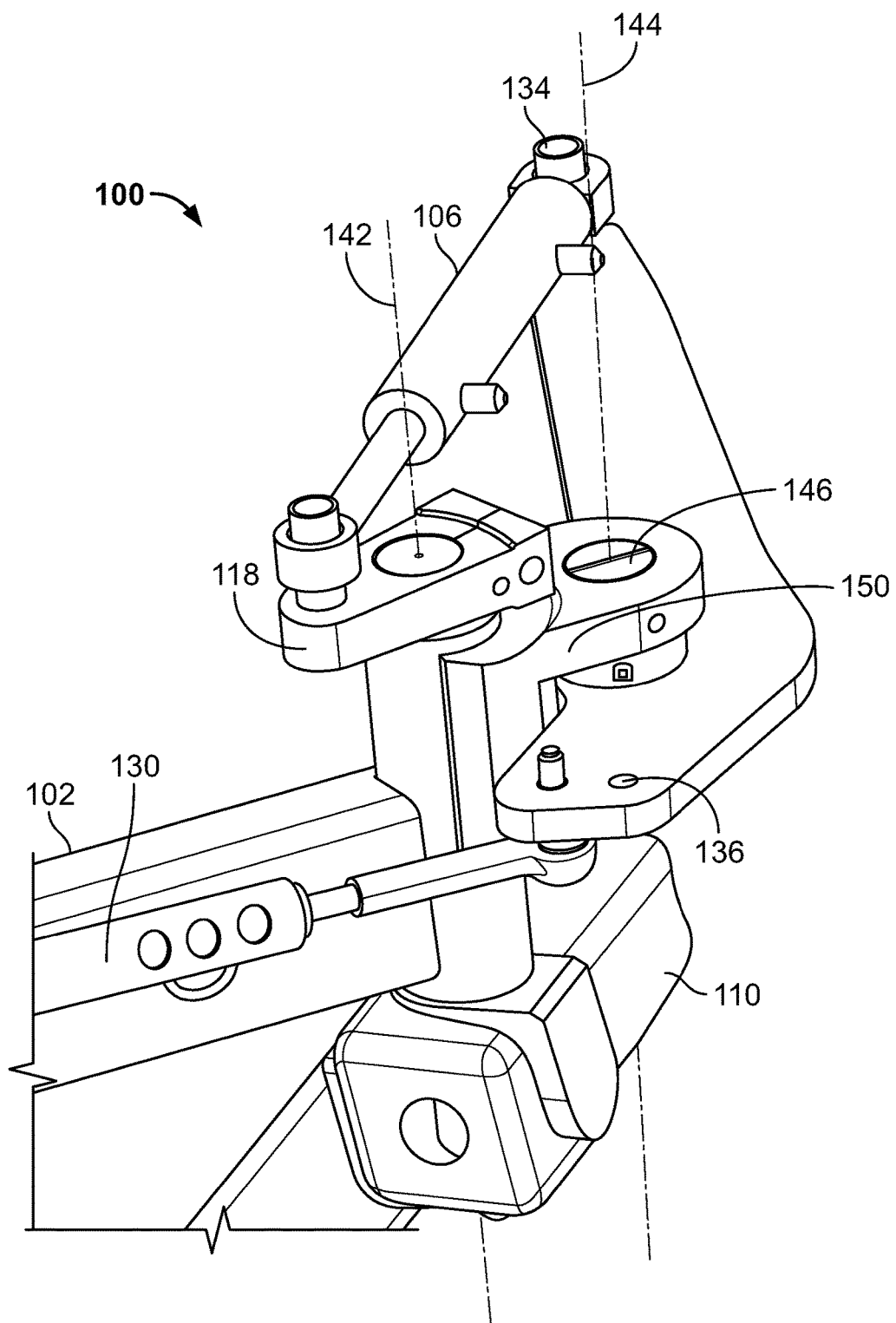
FIG. 7 is a detailed view of an exemplary rear axle steering system of the present disclosure.

In some embodiments, proximity sensors 154 can be used to determine the relative orientation of the casters 110, 112 (see, e.g., FIG. 6). The proximity sensors 154 detect that the casters 110, 112 are essentially behind the rear axle 102 when the windrower is driving substantially straight forward. The system 100 can include additional sensors to provide positive indication or feedback to a controller that the caster cylinders 106, 108 are in the fully retracted position, thereby providing the correct and substantially real-time steering geometry.

The exemplary steering system 100 is capable of being actuated into normal field operation mode and high speed road transport mode. During normal field operation, the central steering cylinder 104 extends fully right or left with respect to the operator (e.g., fully right is shown as an example in the figures). In this position, the steering arms 114, 116 rotate far enough away from the casters 110, 112 such that when the caster cylinders 106, 108 are open to tank on both the rod and barrel ends, the rear caster wheels are able to rotate fully about their vertical axes 142. The caster cylinders 106, 108 are able to extend and retract as the casters 110, 112 rotate, providing a damping force and stabilizing the casters at high ground speeds in the field.

Figure 3:
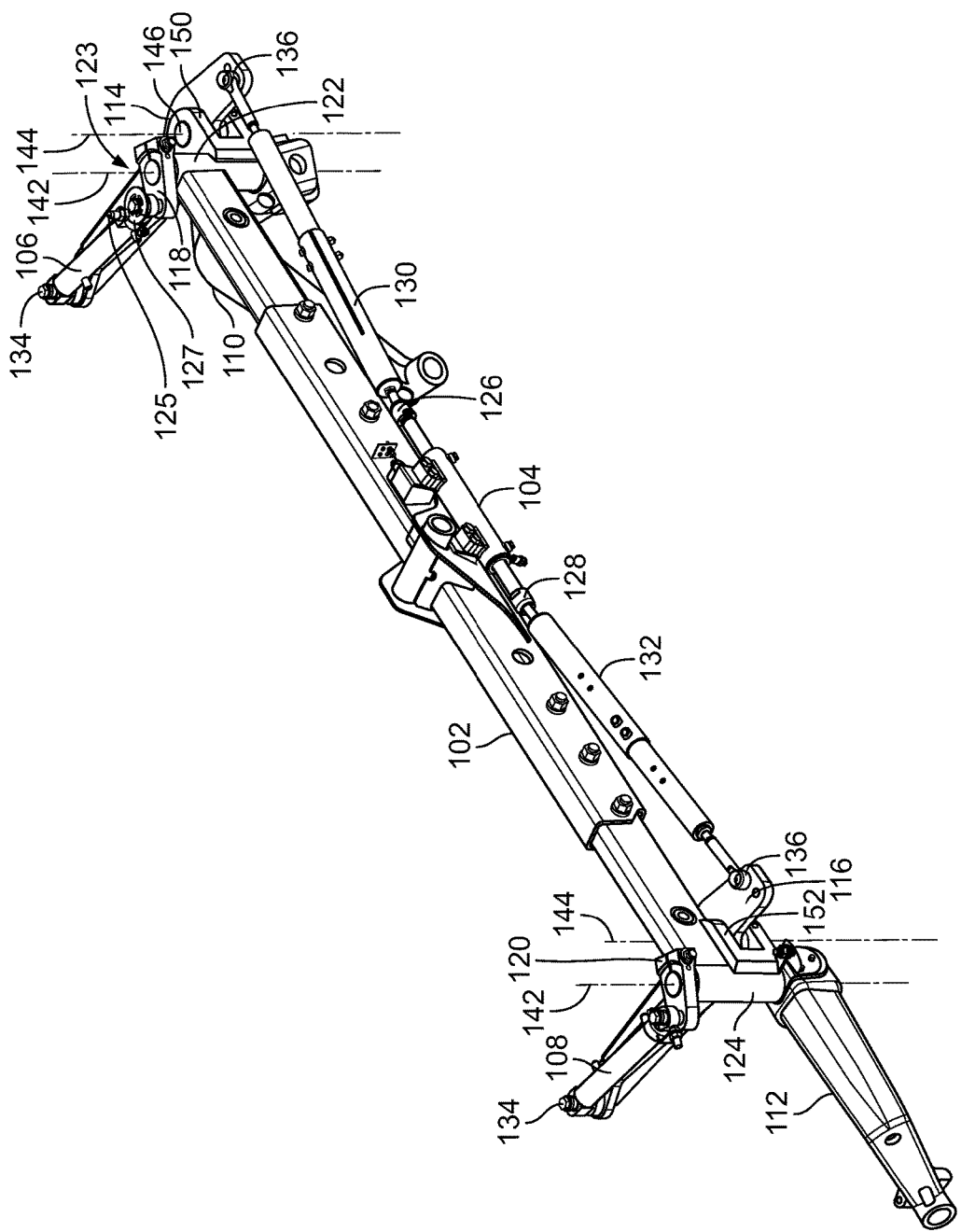
FIG. 3 is a perspective view of an exemplary rear axle steering system of the present disclosure.

During high speed road transport operation, the system 100 functions as follows. The operator selects the road transport, high range, or a similar setting through an operator interface. The controller receives signals from the proximity sensors 154 to determine if the rear wheels are rotated to the rear of the axle 102. If the wheels are not to the rear of the axle 102, the controller prompts the operator to drive straight forward until the wheels are in a position essentially to the rear of the axle 102. The central steering cylinder 104 is actuated into a substantially centered position, and the system 100 applies pressure to the rod end of the caster cylinders 106, 108 to fully retract the cylinders 106, 108. This pressure can either be applied for a predetermined period of time deemed adequate to fully retract the cylinders 106, 108, or one or more proximity sensors can be used to alert the controller with transmitted signals that the cylinders 106, 108 are fully retracted. For example, as shown in FIG. 3, the system 100 can include proximity sensors 123 associated with one or both of the cylinders 106, 108. Each proximity sensor 123 can include a sensing element 125 mounted to a flange connected to the respective cylinder 106, 108, and includes a sensor plate 127 (e.g., a target) mounted to the axle connecting the cylinder 106, 108 and crank arm 118, 120. Thus, as the cylinders 106, 108 are retracted, the sensing element 125 detects the sensor plate 127 as a target, and transmits signals corresponding to detection of the sensor plate 127. Thus, the signals corresponding to detection of the sensor plate 127 correspond to the cylinders 106, 108 in a retracted position. The caster cylinders 106, 108 lock in the fully retracted position at all times during rear axle steering operation and are not actively controlled during rear axle steering.

The rear axle steering geometry is now such that the central steering cylinder 104 can steer the rear wheels. At this point, the steering sensor controls an electro-hydraulic steering valve to position the central steering cylinder 104 based on the detected steering wheel position. During the rear axle steering operation, the controller limits the travel of the steering cylinder in one direction such that the cylinder does not enter the stowed field position, stopping short of this in order to provide an adequate steering angle, but not so much that the casters 110, 112 are able to rotate over center. In some embodiments, the cylinder is mechanically limited steering in the opposite direction in the same manner as conventional steering systems with a stop acting upon the steering arm. In some embodiments, the dual path steering of the windrower can either be used in combination with the rear axle steering system, or the ground drive hydraulics can be locked in a straight condition with crossover valves opening to allow flow between the left and right hand side ground drive motors in order to allow open differential drive of the front wheels.

The system 100 only necessitates cylinder position sensing on a single hydraulic cylinder which, through the use of rigid mechanical links (e.g., tie rods 130, 132 and retracting caster cylinders 106, 108) provides the ability to control the rear steering position of the rear wheels based on the steering wheel position. The use of rigid mechanical links between the steering cylinder 104 and the casters 110, 112 allows precise phasing of the position of the steering wheels, providing Ackerman geometry.

In some embodiments, the caster cylinders 106, 108 can be of single or double acting design, as only the rod end of the cylinder 106, 108 should be pressurized in order to retract the cylinder 106, 108 and achieve the required steering geometry. For double acting cylinders, the barrel end of the cylinder should be open to tank or a low pressure/charge circuit in order to provide a supply of oil or hydraulic fluid to aid in damping of the system 100 during field operation. In some embodiments, the steering arms 114, 116 can mount to either the left or right-hand side of the caster pivot axis 142. The steering cylinder 104 can mount either in front of or behind the axle 102.

The tie rods 130, 132 can mount as either front steer (e.g., with the caster cylinders 106, 108 mounting to the rear of the axle 102 and tie rods 130, 132 to the front) or rear steer (e.g., with the caster cylinders 106, 108 mounted to the front and the tie rods 130, 132 mounted to the rear). The system 100 can be designed in such a manner that the desired steering geometry is achieved by fully extending the cylinders 106, 108 rather than fully retracting them. The proximity sensors 154 can optionally be included to alert the controller that the rear wheels are rotated to the rear of the axle 102 prior to activation of rear axle steering. In some embodiments, rather than the proximity sensors 154 or in addition to the proximity sensors 154, the operator can be relied upon to ensure that the wheels are in the correct orientation. However, use of the proximity sensors 154 is preferred for more accurate feedback to the controller.

Thus, the hydraulic cylinders 106, 108 open to tank and are used as dampers in-field mode operation. In high speed road transport mode, the hydraulic cylinders 106, 108 are used as rigid, non-adjusting steering links with pressure applied to a single chamber (either rod or barrel end) of the cylinders 106, 108 to achieve steering geometry without cylinder position sensing. A single, centrally mounted steering cylinder 104 stows at full extension in one direction to allow full rotation of the casters 110, 112 during dual path steering/field operation mode. The single, centrally mounted steering cylinder 104 uses limited extension in at least one direction during high speed road transport operation in order to provide desired steering angle, thereby not allowing the casters 110, 112 to rotate over center at full lock in one direction. The system 100 does not let the steering cylinder 104 enter the stowed position during high speed transport operation while being mechanically limited in the opposite direction.

FIG. 8 is a top view of the system 100 in a left turn operation with active rear axle steering in high speed road operation mode. Arrow 156 represents the direction of travel. Both caster cylinders 106, 108 are locked in full retraction, making the steering arms 114, 116 rigid links with all control coming from the steering cylinder 104. The steering cylinder 104 has not stroked to full right extension, avoiding the stowed position. FIG. 9 is a top view of the system 100 in a right turn operation with active rear axle steering in high speed road operation mode. The steering cylinder 104 is stroked to full left for this turn, with the steering arms 114, 116 bottoming on a stop.

FIG. 10 is a top view of the system 100 in a neutral operation for in-field dual path steering. In the neutral operation, the windrower travels in a substantially straight path. The steering cylinder 104 is locked in a full stroke right position with both caster cylinders 106, 108 open to tank and able to extend and retract based on caster orientation. FIG. 11 is a top view of the system 100 in a left-hand field turn operation with dual path steering. The steering cylinder 104 is locked in a full stroke right position and the caster cylinders 106, 108 are partially retracted to allow for the left-hand turn.

FIG. 12 is a top view of the system 100 in a right-hand field turn operation with dual path steering. The steering cylinder 104 is locked in a full stroke right position and the caster cylinders 106, 108 are partially extended to allow for the right-hand turn. FIG. 13 is a top view of the system 100 in an in-field reversing maneuver. The steering cylinder 104 is locked in a full stroke right position and the caster cylinders 106, 108 are partially extended with the casters 110, 112 rotated substantially 180° from the neutral position of FIG. 10.

Figure 14:
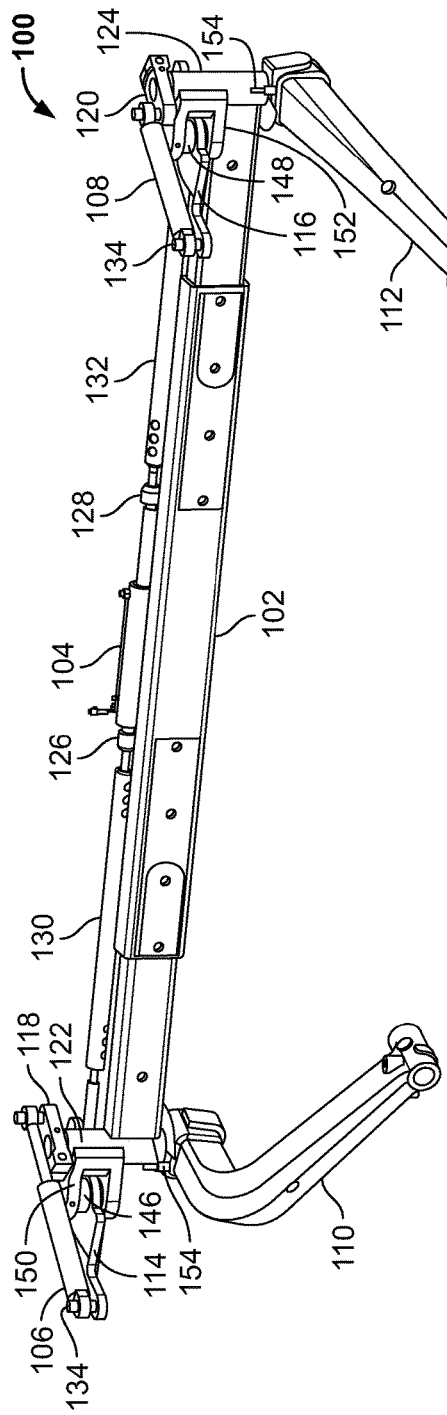
FIG. 14 is a perspective view of an exemplary rear axle steering system of the present disclosure including a proximity sensor.
Figure 15:
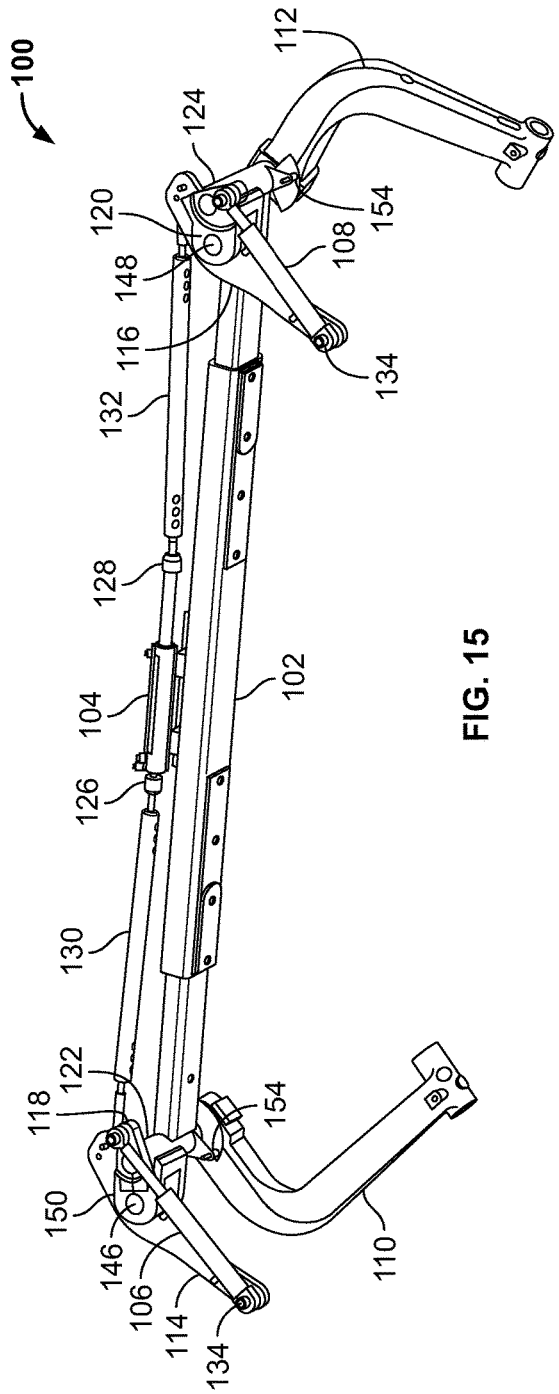
FIG. 15 is a perspective view of an exemplary rear axle steering system of the present disclosure including a proximity sensor.
Figure 16:
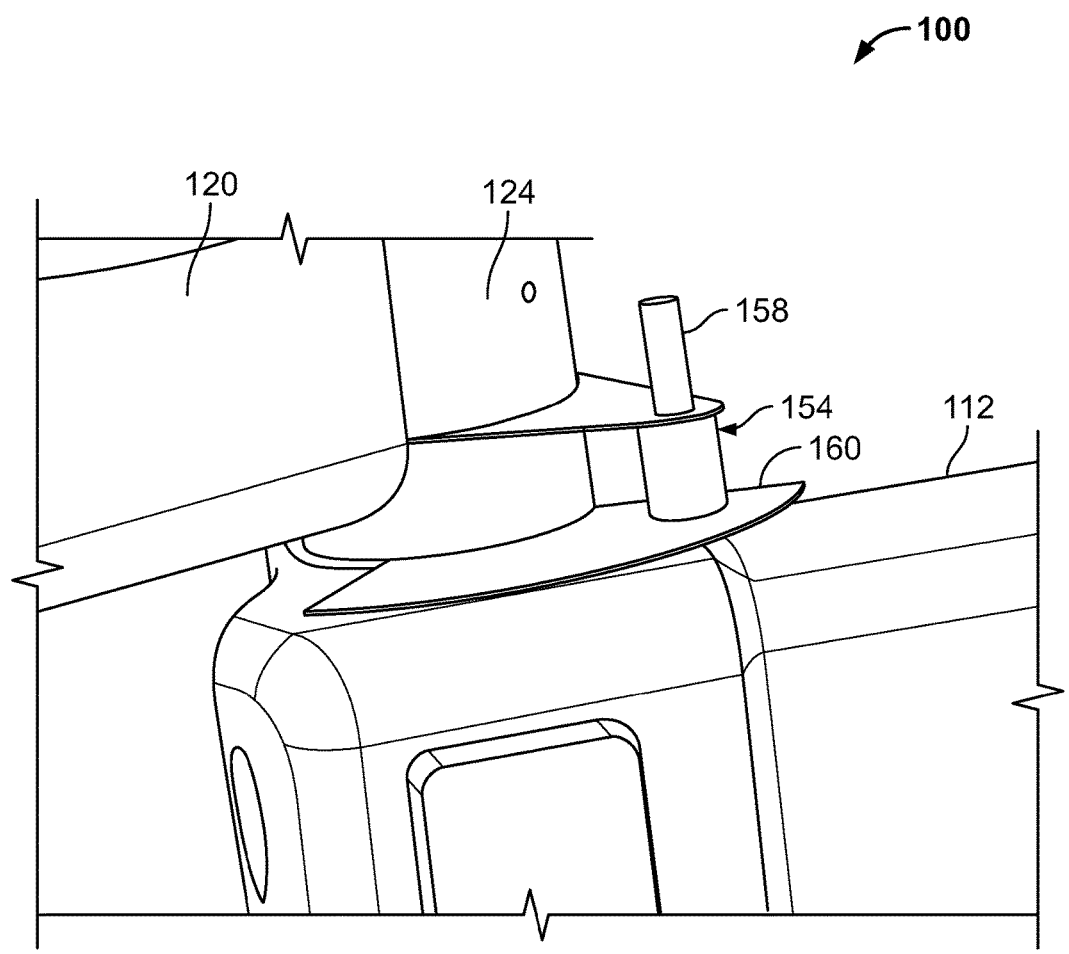
FIG. 16 is a detailed view of a proximity sensor of an exemplary rear axle steering system of the present disclosure.

FIGS. 14-16 are perspective and detailed views of the system 100 including the proximity sensor 154 associated with each caster 110, 112. Proximity sensors 154 are provided on both sides of the system 100 to eliminate the possibility that the caster cylinders 106, 108 will retract when the casters 110, 112 are not oriented to the rear of the axle 102. The operator can be prompted to drive straight forward until both sensors 154 indicate that the casters 110, 112 are to the rear of the axle 102. The proximity sensors 154 detect and transmit signals regarding the relative orientation of the caster wheels, and do not indicate the actual position of such wheels.

In particular, each proximity sensor 154 includes a sensing element 158 rigidly mounted to the axle extension 122, 124. Each proximity sensor 154 further includes a sensor plate 160 (e.g., a target) mounted to the wheel arm of the caster 110, 112. Upon rotation of the caster 110, 112, the sensing element 158 detects the change in radial position of the sensing element 158 relative to the sensor plate 160. Thus, the proximity sensor 154 indicates the relative orientation of the caster 110, 112 to the sensing element 158. As an example, in FIG. 14, the casters 110, 112 and sensor plates 160 have been rotated to a position beyond the sensing element 158. Therefore, the proximity sensor 154 cannot sense the sensor plate and the system 100 will not retract the caster cylinders 106, 108.

In contrast, FIG. 15 shows the casters 110, 112 and sensor plates 160 rotated to a position where the sensing element 158 can detect the sensor plate 160. In such position, the proximity sensors 154 are sensing the sensor plates 160 and transmit signals to the controller for retracting the caster cylinders 106, 108 to enable rear axle steering. The proximity sensors 154 therefore assist in transmitting signals regarding the relative orientation of the casters 110, 112 to the axle 102, indicating to the operator to drive in a substantially straight path until both sensors 154 indicate that the casters 110, 112 are to the rear of the axle 102.

Figure 17:
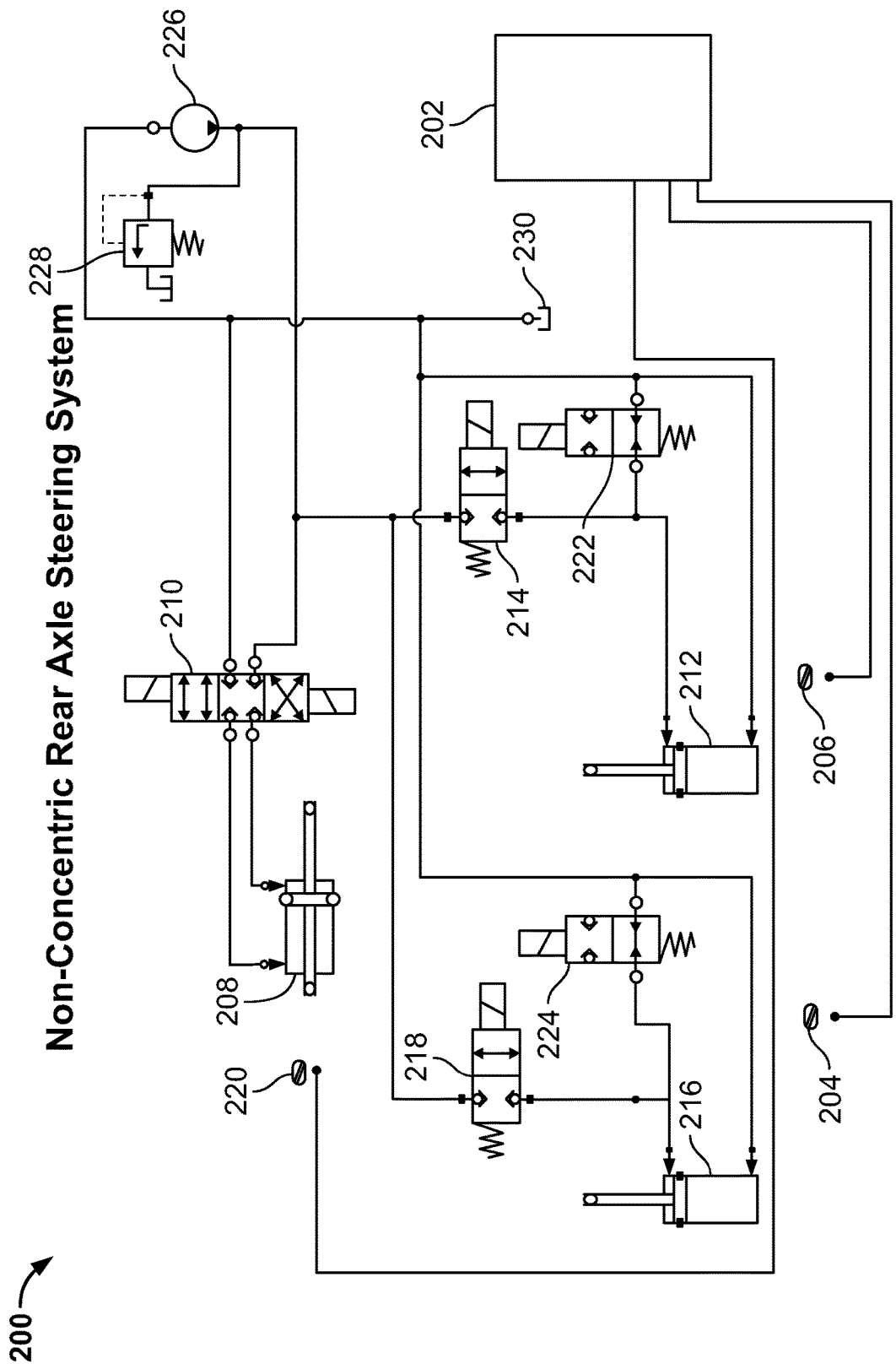
FIG. 17 is a static image of a hydraulic circuit of an exemplary rear axle steering system of the present disclosure.

FIG. 17 is a static image of a hydraulic circuit 200 of the system 100. The hydraulic circuit 200 includes a controller 202, a left-hand side caster proximity sensor 204, and a right-hand side caster proximity sensor 206. The hydraulic circuit 200 includes steering cylinder 208 and a steering directional valve 210. The hydraulic circuit 200 includes right-hand side caster cylinder 212 with a right-hand side caster cylinder control valve 214, and a left-hand side caster cylinder 216 with a left-hand side caster cylinder control valve 218. The hydraulic circuit 200 includes a steering cylinder position sensor 220 (or any type of linkage position sensing mechanism). The hydraulic circuit 200 includes blocking valves 222, 224 for the right and left-hand sides, a pump 226, a relief valve 228, and tank 230. Although the damping cylinder blocking valves 222, 224 are shown as normally open, it should be understood that in some embodiments, the damping cylinder blocking valves 222, 224 can be normally closed depending on the overall design of the system. With the damping cylinder blocking valves 222, 224 in a normally open position, if a loss of power occurs and operation continues in a failure more, the system defaults to dual-path steering.

Figure 18:
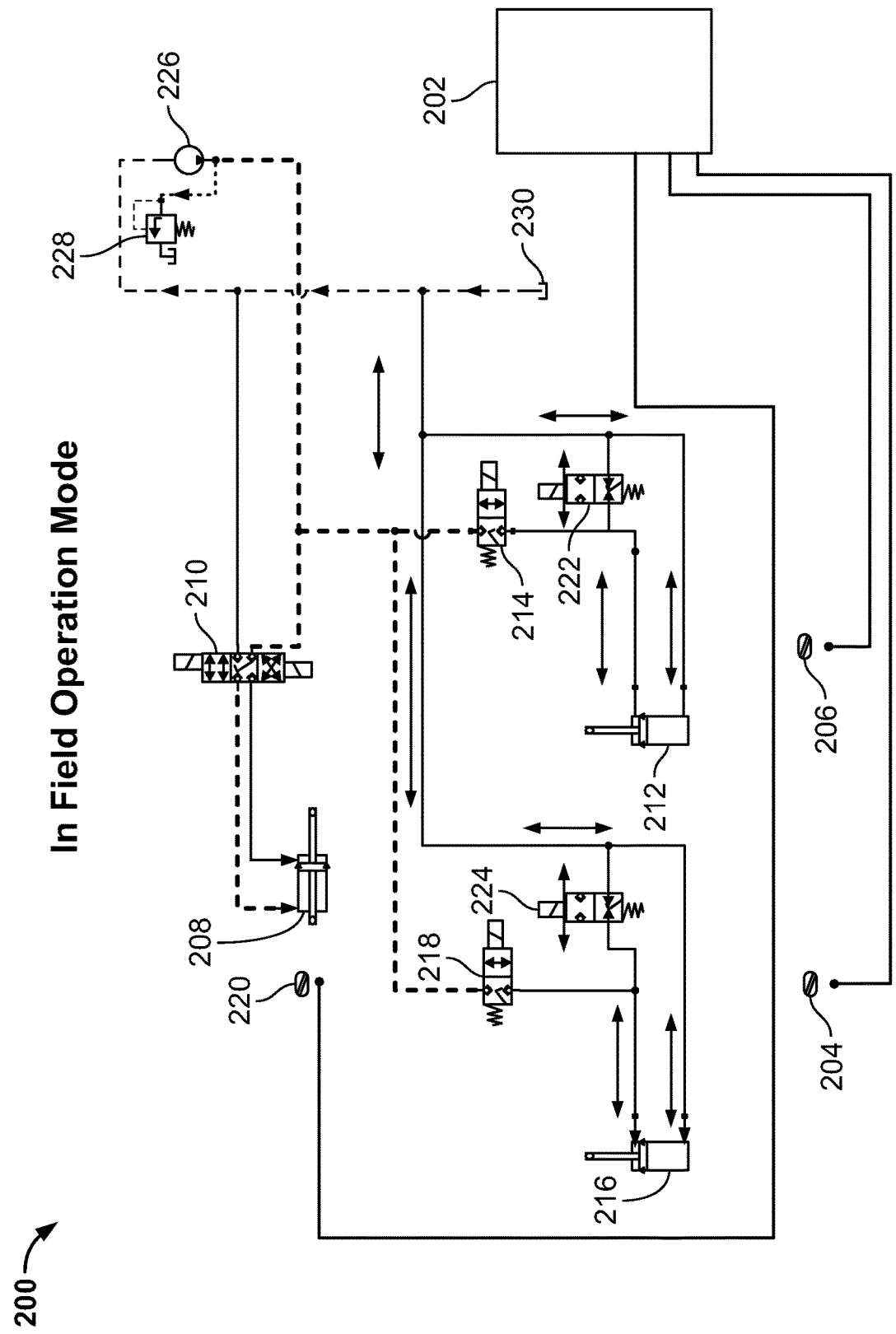
FIG. 18 is the hydraulic circuit of FIG. 17 in an in-field operation mode.

FIG. 18 is the hydraulic circuit 200 in an in-field operation mode. The steering cylinder 208 has been actuated and locked into a full extension (e.g., stowed position, full machine right in the double rod cylinder design). Both caster cylinders 212, 216 have been actuated to open to tank 230, allowing the casters to freely pivot with the caster cylinders acting as the shimmy dampers and free flow into and out of the caster cylinders. The steering directional valve 210 and the caster cylinder control valves 214, 218 are actuated into a closed position. The blocking valves 222, 224 are actuated into an open position.

Figure 19:
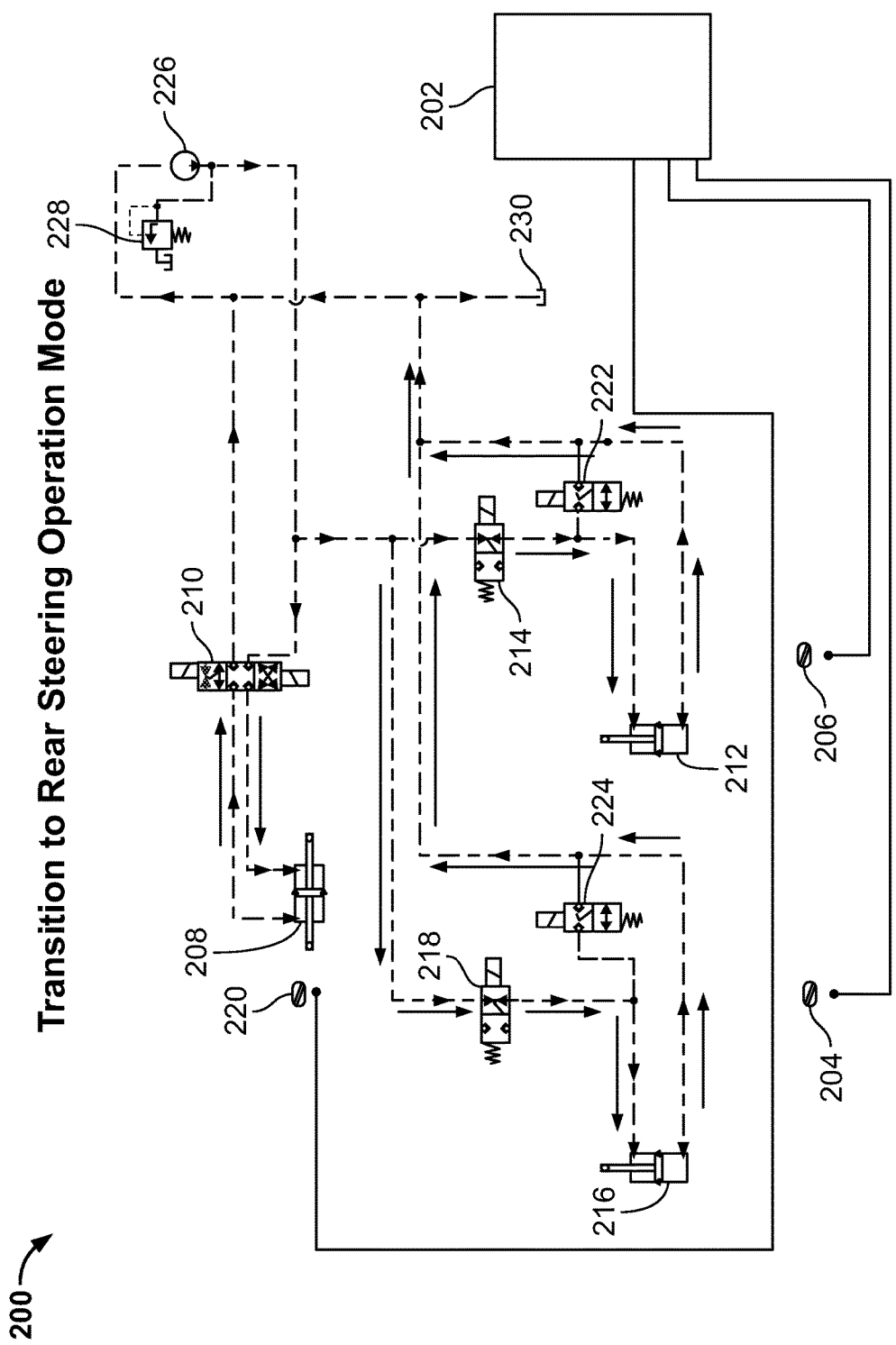
FIG. 19 is the hydraulic circuit of FIG. 17 in a transition from in-field operation mode to rear steering operation mode.

FIG. 19 is the hydraulic circuit 200 in a transition from in-field operation mode to rear steering operation mode. The caster cylinder control valves 214, 218 are actuated into an open position to provide pressure to the rod end of the caster cylinders 212, 216, thereby retracting the caster cylinders 212, 216. The damping cylinder blocking valves 222, 224 are actuated into a closed position to block flow to tank 230. The steering directional valve 210 is shifted to transition the steering cylinder 208 to a substantially centered position in preparation for rear steering operation mode.

Figure 20:
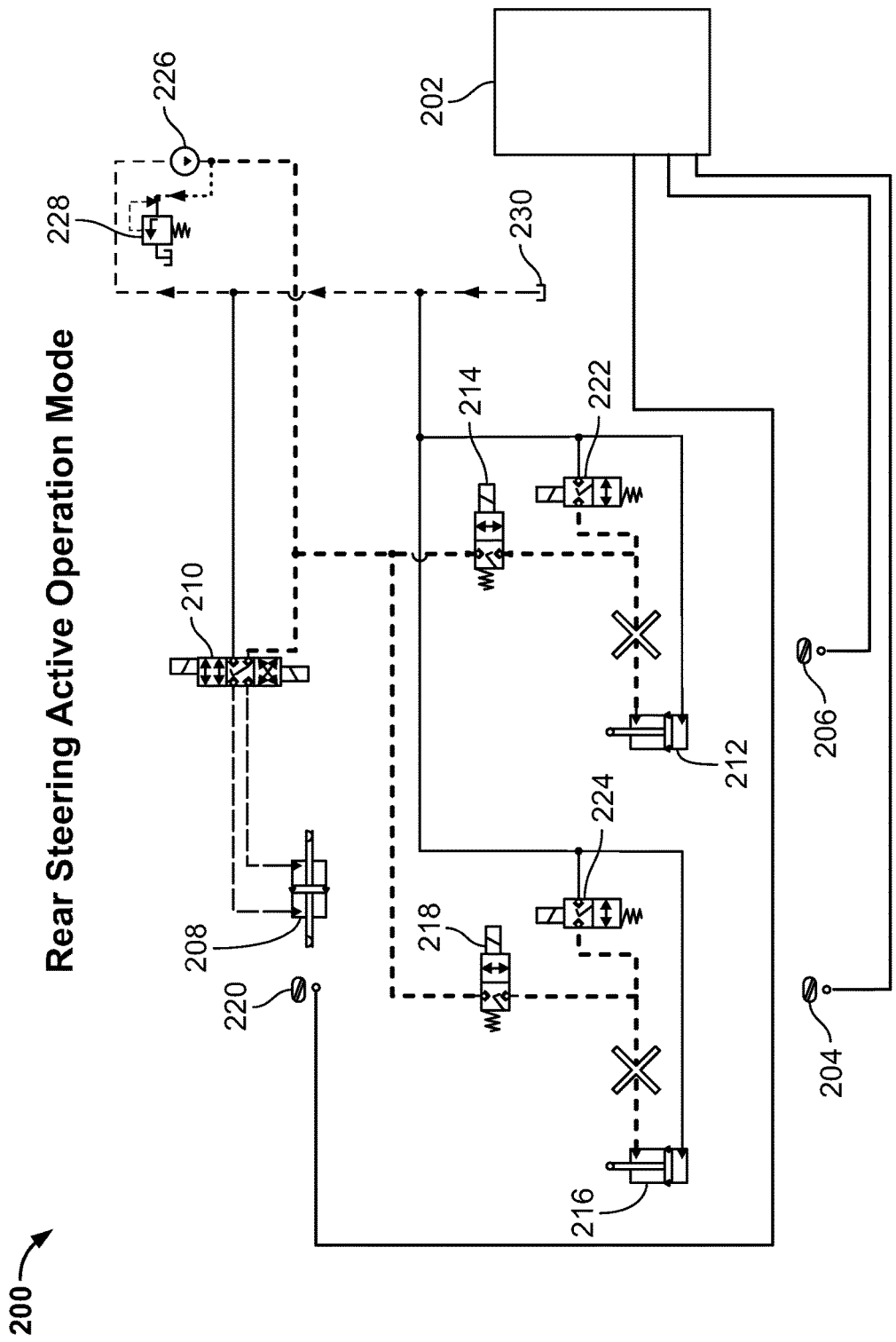
FIG. 20 is the hydraulic circuit of FIG. 17 in a rear steering active operation mode.

FIG. 20 is the hydraulic circuit 200 in a rear steering active operation mode. Both caster cylinders 212, 216 have been retracted and the blocking valves 222, 224 are closed, thereby locking both caster cylinders 212, 216 in a locked, full retracted position. There is no flow into or out of the caster cylinders 212, 216. This makes the steering arms a rigid body and allows the steering cylinder 208 to control the casters. In particular, the steering cylinder directional valve 210 is used to control the steering cylinder 208 based on the steering wheel position (e.g., as detected by the sensor 220). In FIG. 20, the steering cylinder 208 is depicted as traveling in a neutral direction (e.g., substantially straight). In this position, the controller 202 does not permit the steering cylinder 208 to enter the stowed position during rear axle steering operation mode as this would allow the casters to go over center.

Figure 21:
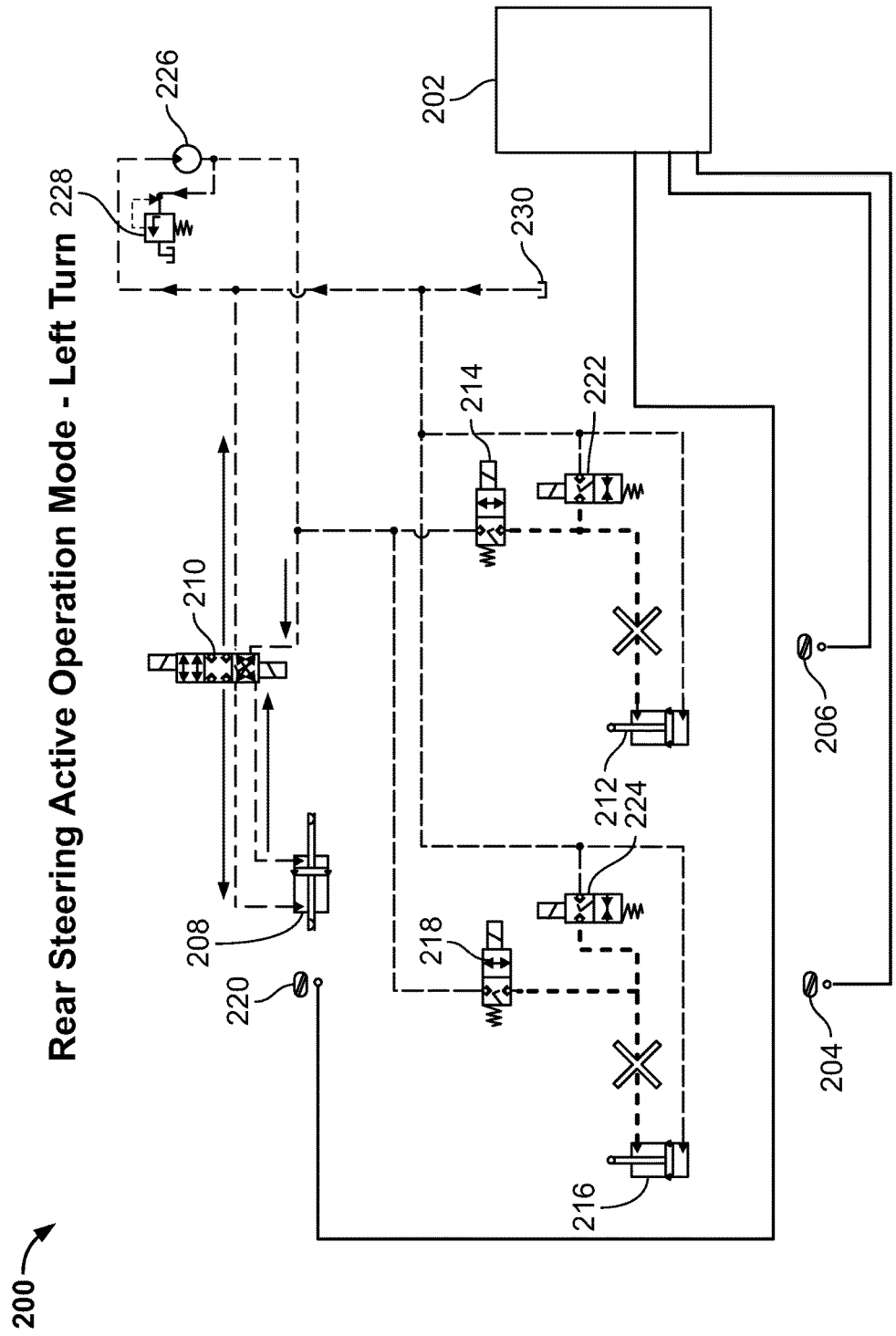
FIG. 21 is the hydraulic circuit of FIG. 17 in a rear steering active operation mode during a left turn maneuver.

FIG. 21 is the hydraulic circuit 200 in a rear steering active operation mode during a left turn maneuver. The steering valve 210 has been shifted partially to extend the steering cylinder 208 to the right for making the left-hand turn. The controller 202 does not allow the steering cylinder 208 to extend into the full stowed position during left hand turns with the rear axle steering active. The caster cylinders 212, 216 are locked in a fully retracted position by the caster cylinder valves 214, 218, with no flow going into or out of the caster cylinders 212, 216.

Figure 22:
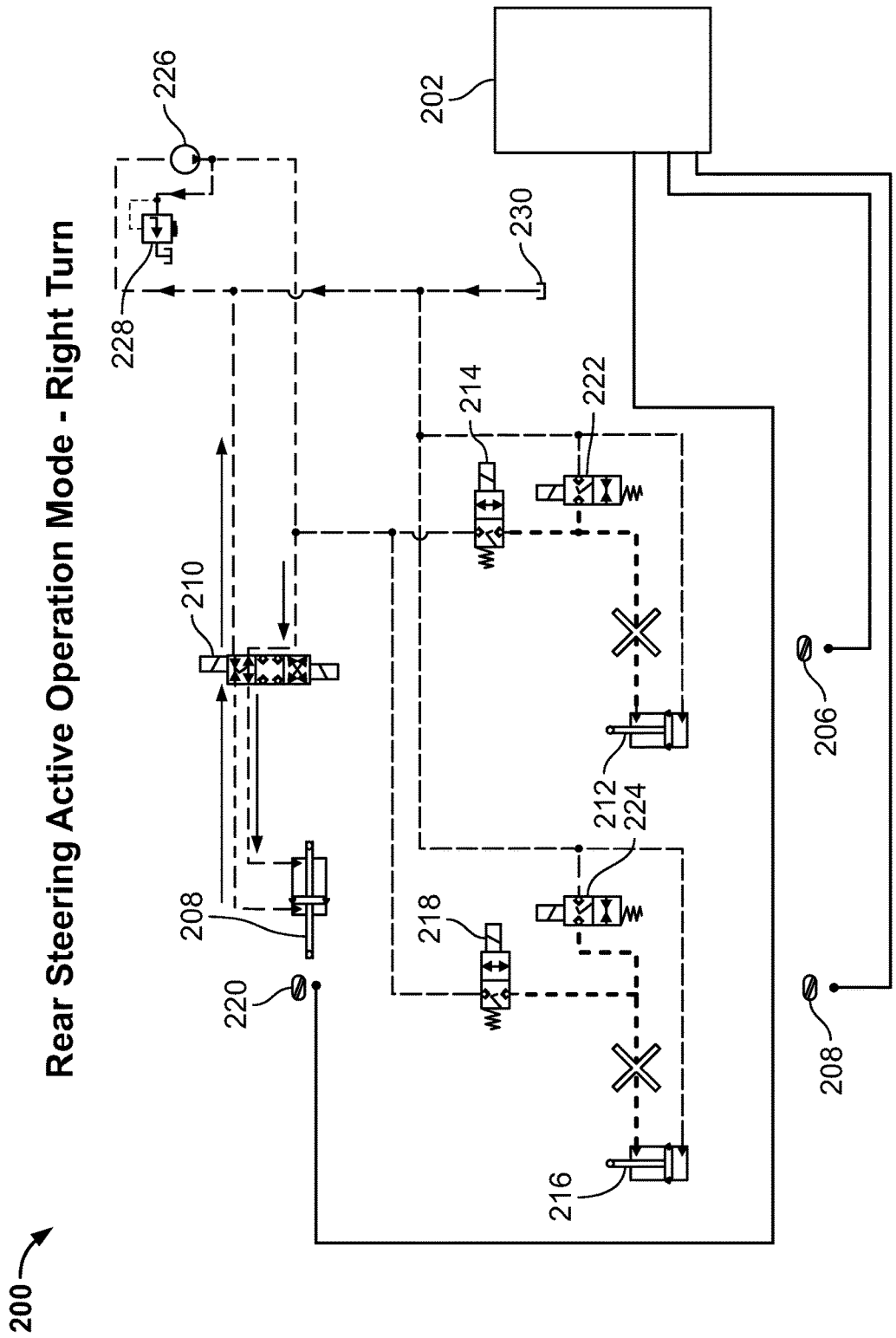
FIG. 22 is the hydraulic circuit of FIG. 17 in a rear steering active operation mode during a right turn maneuver.

FIG. 22 is the hydraulic circuit 200 in a rear steering active operation mode during a right turn maneuver. The steering valve 210 has been shifted partially to extend the steering cylinder 208 to the left for making the right-hand turn. Because there is a physical stop in the full stroke left direction, the controller 202 is unable to move the steering cylinder 208 to the full stroke left position and the casters do not go over center. The caster cylinders 212, 216 are locked in a fully retracted position by the caster cylinder valves 214, 218, with no flow going into or out of the caster cylinders 212, 216.

Figure 23:
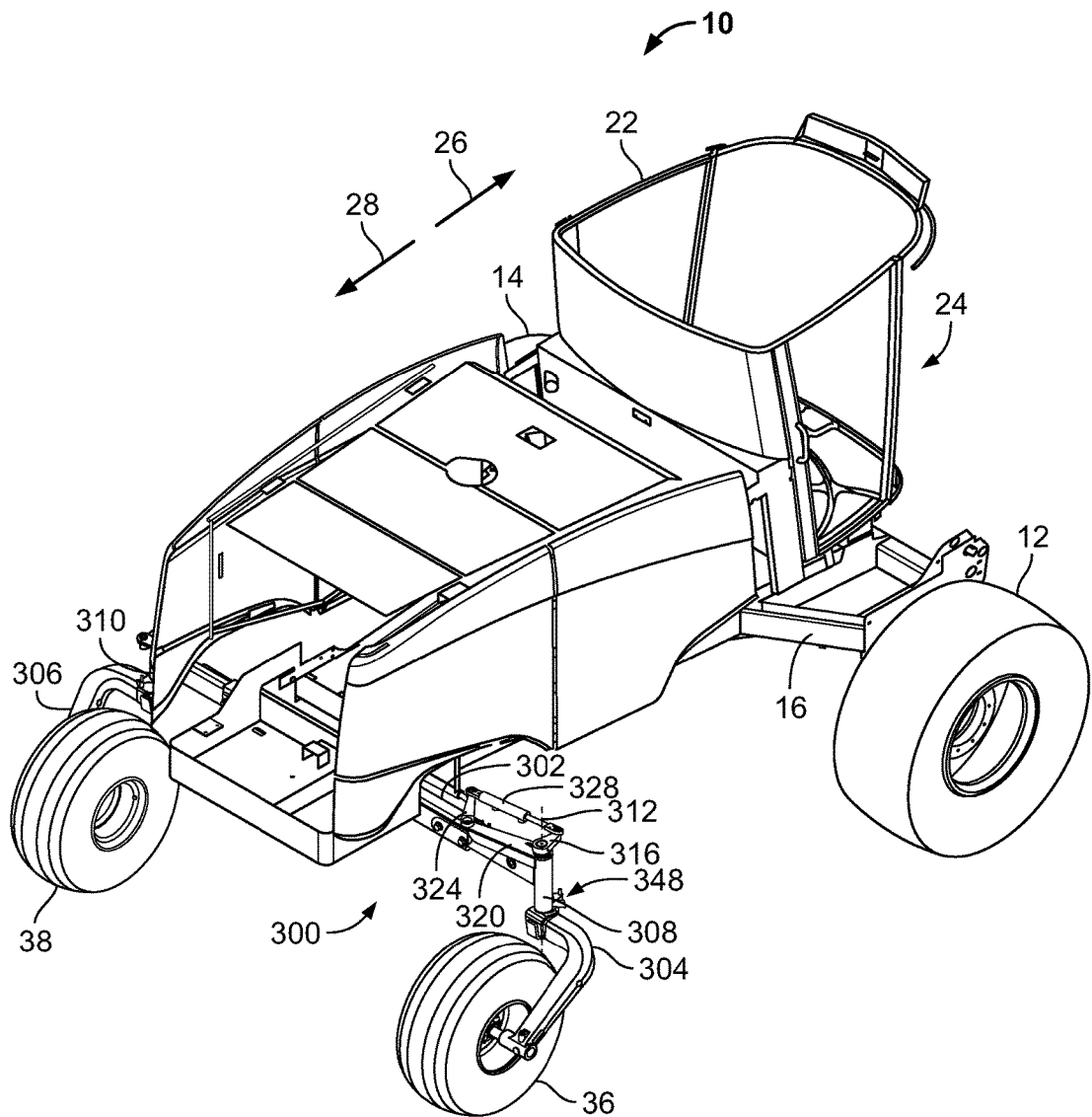
FIG. 23 is a perspective view of an exemplary rear axle steering system of the present disclosure incorporated into a windrower.
Figure 24:
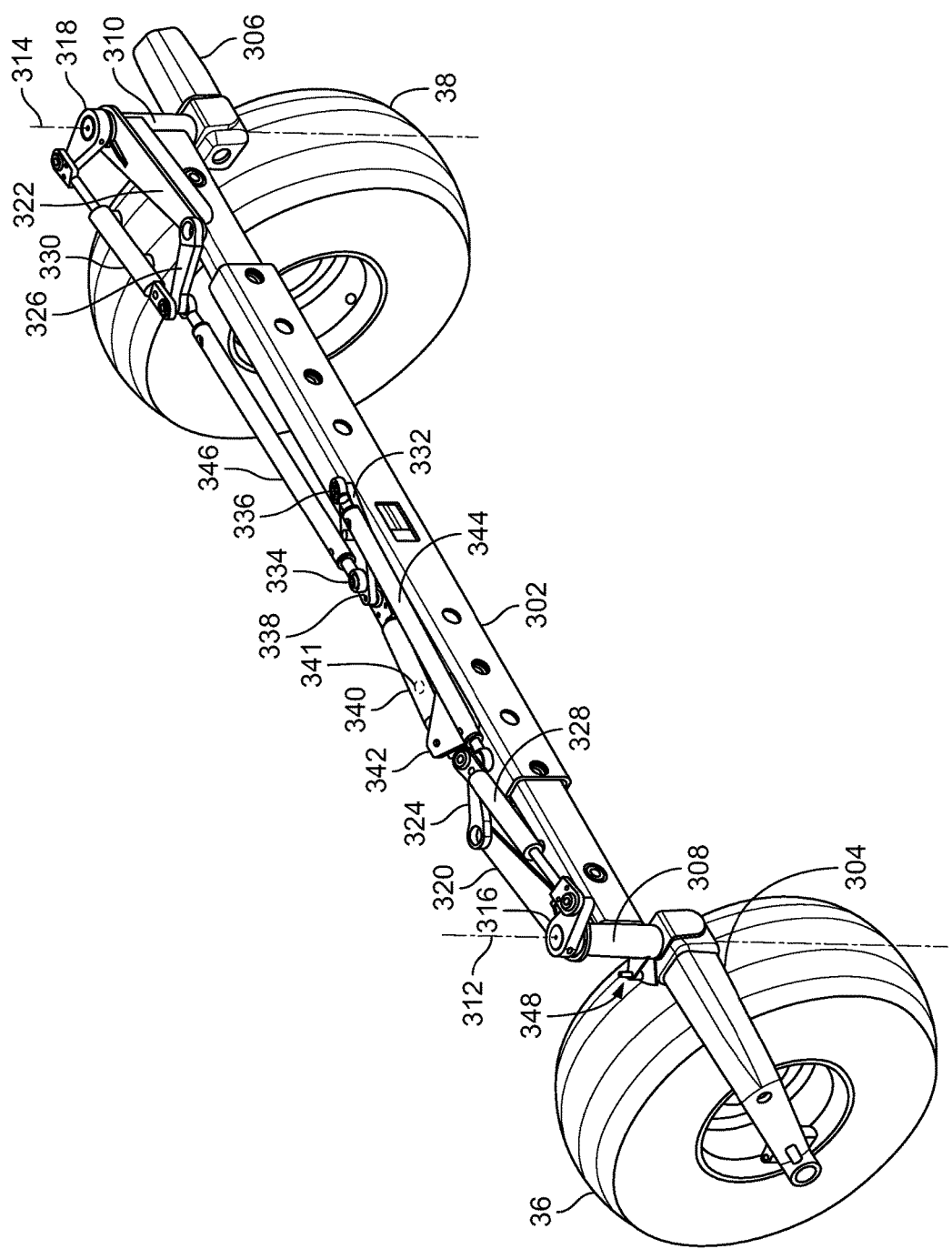
FIG. 24 is a perspective view of an exemplary rear axle steering system of the present disclosure.
Figure 25:
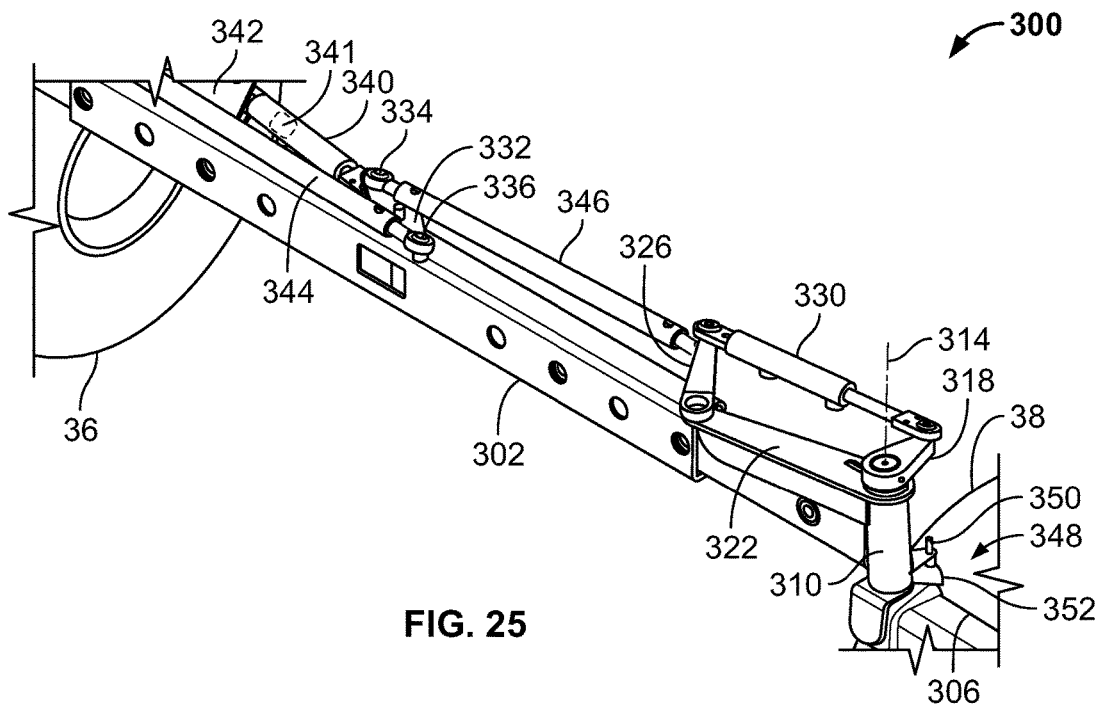
FIG. 25 is a detailed perspective view of an exemplary rear axle steering system of the present disclosure.
Figure 26:
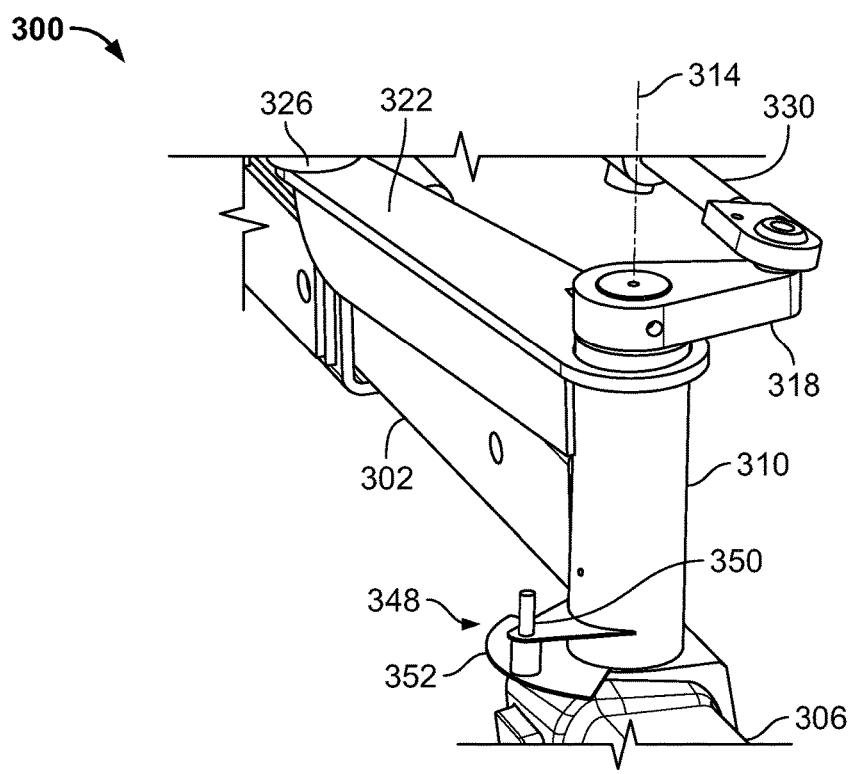
FIG. 26 is a detailed view of an exemplary rear axle steering system of the present disclosure.

With reference to FIGS. 23-27, another embodiment of an exemplary rear axle steering system 300 (hereinafter "system 300") is provided. The system 300 can be selectively used for high speed rear steering operation mode, while also providing anti-shimmy damping for in-field operation mode. As shown in FIG. 23, the system 300 can be incorporated into a conventional windrower 10 of FIG. 1. Therefore, similar reference numbers refer to similar structures. The system 300 can be substantially similar to the system 100, except that rather than non-concentric positioning of the steering arms, the steering arms of the system 300 are concentrically positioned relative to the caster pivot shaft (e.g., aligned along the same axis of rotation).

The system 300 is mounted to one or more rear axles 302 of the windrower 10. Casters 304, 306 are pivotally mounted on opposing sides of the rear axle 302 and receive respective caster wheels 36, 38. Each caster 304, 306 includes a caster vertical pivot shaft 308, 310 about which the caster 304, 306 pivots. Axis 312, 314 represents the pivot axis of the shafts 308, 310. The system 300 includes a steering arm or mount 316, 318 concentrically coupled to the pivot shaft 308, 310 of the casters 304, 306. The mounts 316, 318 therefore pivot on the same axis 312, 314. Brackets 320, 322 are rigidly mounted to the shafts 308, 310 and provide a pivotal mounting for idler arms 324, 326. The shafts 308, 310 pivot at respective axes 312, 314. Caster pitman arms 324, 326 are pivotally coupled to the opposing ends of the brackets 320, 322, with hydraulic cylinders 328, 330 coupled between the idler arms 324, 326 and the mounts 316, 318.

A single, central rocker arm 332 is mounted at a substantially central portion of the axle 302. The rocker arm 332 includes pivots 334, 336 on opposing ends that are located fore and aft of the axle 302 (see, e.g., FIG. 27) when the system 300 is in a neutral position. A third pivot 338 is provided on the rocker arm 332 adjacent to the pivot 334, onto which one end of a steering cylinder 340 is pivotally mounted. The opposing end of the steering cylinder 340 is pivotally mounted to the axle 302 by a mounting bracket 342. The steering cylinder 340 can include position feedback sensing in the form of any position sensing system, such as internal or external linear sensing, a radial potentiometer on a rocker arm, or the like. In some embodiments, the sensing system can be in the form of one or more sensors 341 configured to detect the position of the steering cylinder and transmit the detected position to a central controller.

The system 300 includes tie rods 344, 346 in the form of drag links that extend from the fore/aft pivots 334, 336 of the rocker arm 332 and connect to the idler arms 324, 326. The brackets 320, 322 can be rigidly mounted to the extensions or shafts 308, 310, and therefore the brackets 320, 322 do not pivot. The caster pitman arms 324, 326 can be pivotally coupled at their base to the brackets 320, 322. Similar to system 100, system 300 can include proximity sensors 348 on the casters 304, 306 to provide orientation information (e.g., rough position of the caster 304, 306 with respect to the rear axle 302). Each proximity sensor 348 includes a sensing element 350 rigidly mounted to the axle extension 308, 310 and a sensor plate 352 mounted to the wheel arm of the caster 304, 306. Rotation of the plate 352 with the caster 304, 306 is thereby detected by the sensing element 350. It should be noted that the proximity sensors 348 are not used for steering position feedback. Instead, the sensors 348 alert the controller and/or operator that the casters 304, 306 are essentially behind the axle 302 and provide no further position feedback. In some embodiments, the sensors 348 can be in the form of a magnetic pick up sensor that alerts the controller any time the casters 304, 306 are within less than 90 degrees of straight behind the rear axle 302.

The system 300 can be actuated to operate in a normal, field operation mode and a high speed road transport operation mode. During field operation, the steering cylinder 340 is fully retracted (or extended, depending on the configuration of the system 300). At this position, the caster cylinders 328, 330 are open to tank on both rod and barrel ends. This geometry allows the casters 304, 306 to pivot freely, allowing zero radius turns. Since the caster cylinders 328, 330 remain mechanically coupled to the caster pitman arms 324, 326, the cylinders 328, 330 extend and retract as the casters 304, 306 freely pivot. The extension and retraction of the cylinders 328, 330 provides a damping force during field operation due to the residual oil or hydraulic fluid flowing into and out of the rod and barrel ends of the cylinders 328, 330 during operation. However, as the cylinders 328, 330 are open to tank, no pressure is provided to cause extension or retraction of the cylinders 328, 330 during field operation.

During high speed road transport operation mode, the operator first selects the rear steer operation (or something similar) in a control panel of the windrower. The controller opens the steering cylinder 340 to tank on both the rod and barrel ends, while both of the caster cylinders 328, 330 remain open to tank. The controller prompts the operator to drive in a substantially straight path to ensure that the casters 304, 306 are rotated to the rear of the windrower axle 302 and aligned for straight ahead travel. Such operation is necessary to ensure that the casters 304, 306 are behind the rear axle 302 and within the steering range of the system 300 before the caster cylinders 328, 330 are retracted. Otherwise, the casters 304, 306 can potentially lock in a position ahead of the axle 302 and not be oriented in a direction to allow for straight ahead travel.

Once the proximity sensors 348 alert the controller that both casters 304, 306 are substantially behind the rear axle 302, pressure is applied to the rod end of the caster cylinders 328, 330, fully retracting and locking the cylinders 328, 330 in the fully retracted position. Retraction of the cylinders 328, 330 can occur simultaneously, or be sequenced to retract one cylinder 328, and then retract another cylinder 330. By retracting and locking the cylinders 328, 330, the caster cylinders 328, 330 become rigid tie rods coupled to the idler arms 324, 326 and the tie rods 344, 346, and control the position of the steering cylinder 340 which is still open to tank.

The controller senses the position of the steering cylinder 340 and applies pressure to either the rod or barrel end in order to phase the cylinder 340 with the dual path steering. Once the rear steering is phased with the dual path front steering, rear steering is active with operator inputs to the steering wheel being used to extend or retract the steering cylinder 340 to provide rear steering. During rear steering operation, the steering cylinder 340 is not allowed to retract fully. Instead, the steering cylinder 340 uses only enough retraction in order to match the steering angle achieved when fully extended. The limited retraction of the cylinder 340 ensures that the casters 304, 306 cannot fully pivot, and are constrained to the predetermined steering angles of the steering geometry controlled by the steering cylinder 340. The retraction limitation of the steering cylinder 340 can be accomplished either through a mechanical lockout or limited through position sensing of the retraction of the cylinder 340. The steering cylinder 340 fully retracts only during field operation where the extra retraction allows the casters 304, 306 to freely pivot based on the windrower direction of travel.

The system 300 therefore provides a fixed geometry steering configuration that can be designed to provide Ackerman, and uses position feedback of only one cylinder using a position sensor. Hydraulic cylinders 328 330 are used as shimmy dampers for field operation and as solid links in a drag-link steering system for road transport operation. A single steering cylinder 340 with position feedback is used without caster position to provide rear axle steering on both rear wheels of the windrower. The steering cylinder 340 is designed such that when the steering cylinder 340 is fully retracted, the casters 304, 306 are able to rotate/pivot freely. When the steering cylinder 340 is limited to a predetermined length of retraction and the caster cylinders 328, 330 are fully retracted, the casters 304, 306 are limited to the full extension of the steering cylinder 340 and the limited retraction of the steering cylinder 340 to provide limited steering angel of the caster wheels.

The system 300 does not necessitate the phasing of two steering cylinders, resulting in a more stable and consistent operation. In some embodiments, the operation of the system 300 can be varied by retracting a cylinder where the above-described operation extends a cylinder, and extending a cylinder where the above-described operation retracts a cylinder. For example, the steering cylinder 340 can be fully extended during field operation mode, and only partly extended and fully retracted during rear steer operation mode. The configuration of the idler arms 324, 326 and tie rods 344, 346 can be varied. For example, the figures show front steer on one side and rear steer on the opposing side of the system 300. However, the system 300 can be designed such that both casters 304, 306 are front steer or both are rear steer with requisite changes in geometry. In some embodiments, any number of linear cylinders can be used. The steering cylinder 340 can be of any type, e.g., hydraulic, electric, pneumatic, or the like.

Figure 27:
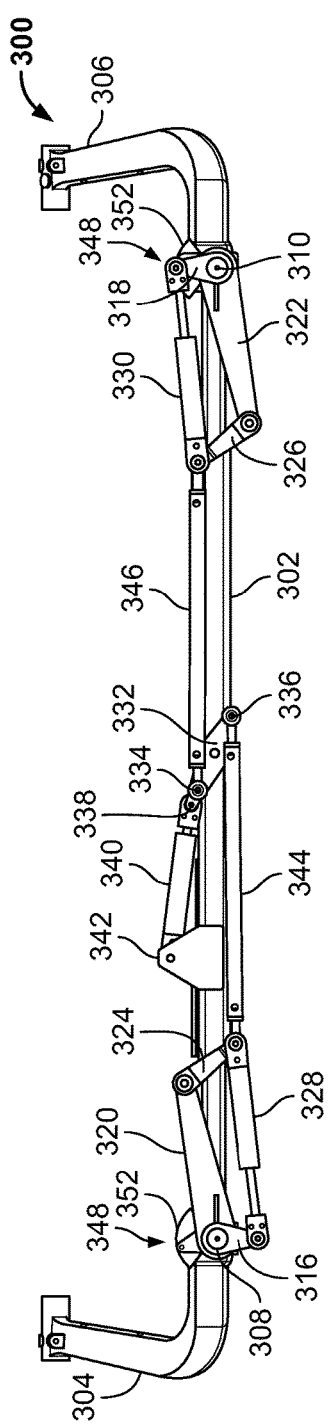
FIG. 27 is a top view of an exemplary rear axle steering system in a neutral position for dual-path in-field operation mode.
Figure 28:
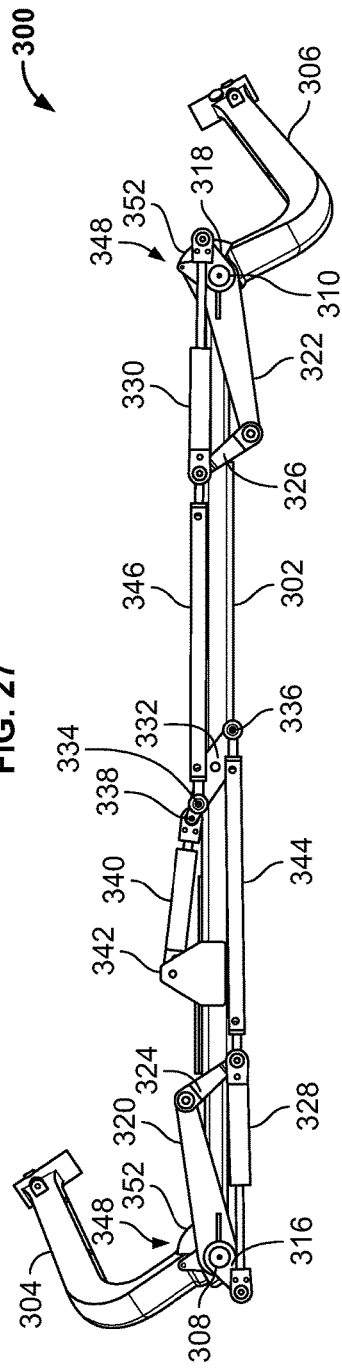
FIG. 28 is a top view of an exemplary rear axle steering system in a left turn maneuver.
Figure 29:
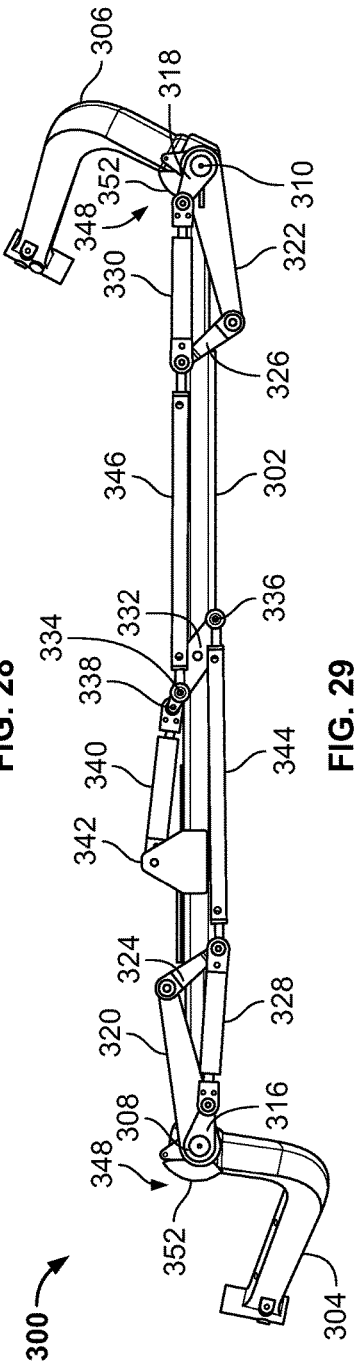
FIG. 29 is a top view of an exemplary rear axle steering system in a right turn maneuver.

FIG. 27 is a top view of the system 300 in a neutral position for dual-path in-field operation mode. The steering cylinder 340 is fully retracted and the caster cylinders 328, 330 are open to tank to allow for substantially straight movement of the windrower. FIG. 28 is a top view of the system 300 in a left turn maneuver for in-field operation mode. The steering cylinder 340 is fully retracted and locked, and the caster cylinders 328, 330 are open to tank to allow the casters 304, 306 to pivot freely while retracting and extending the caster cylinders 328, 330 during turns. FIG. 29 is a top view of the system 300 in a right turn maneuver for in-field operation mode. The steering cylinder 340 remains fully retracted and locked, and the caster cylinders 328, 330 are open to tank to allow the casters 304, 306 to pivot freely while extending and retracting the caster cylinders 328, 330.

Figure 30:
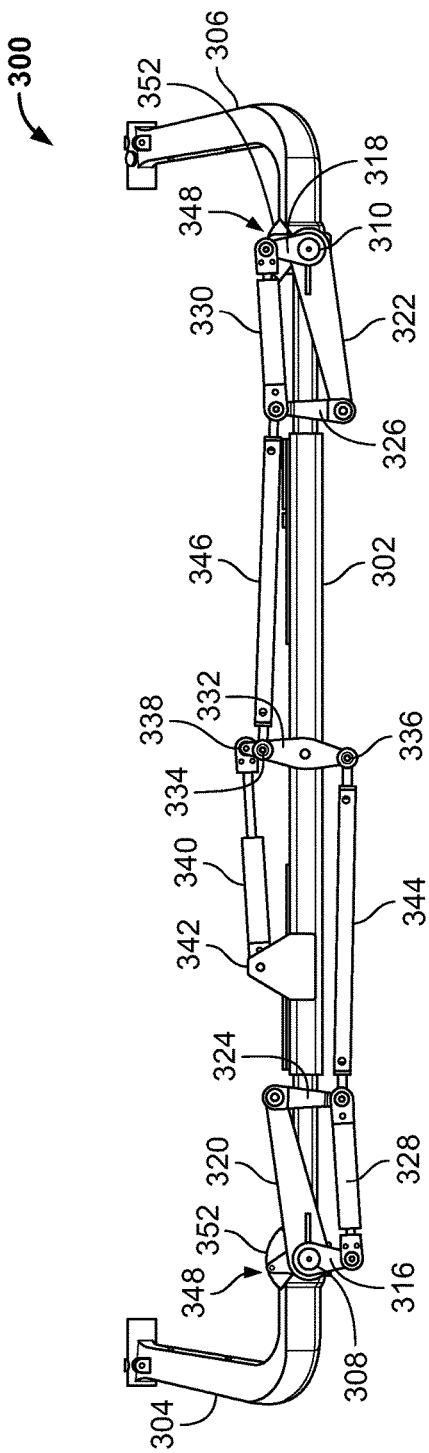
FIG. 30 is a top view of an exemplary rear axle steering system in a high speed road operation mode and in a neutral position.
Figure 31:
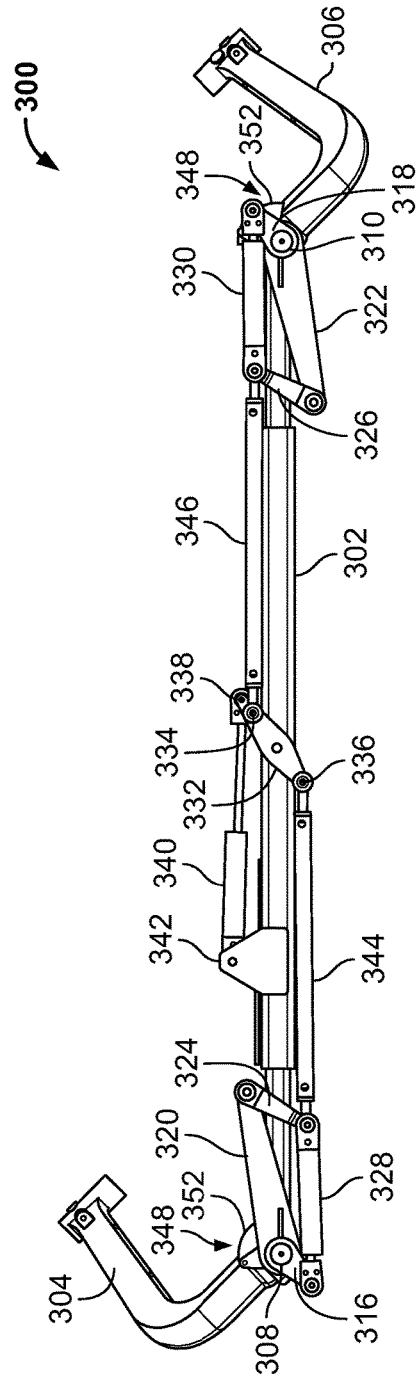
FIG. 31 is a top view of an exemplary rear axle steering system in a high speed road operation and in a left turn maneuver.

FIG. 30 is a top view of the system 300 in a high speed road operation mode and in a neutral position. To attain this configuration, the steering cylinder 340 is open to tank and, once the proximity sensors 348 detect that the casters 304, 306 are behind the axle 302, the caster cylinders 328, 330 are fully retracted and locked in a drag link configuration. The neutral position of FIG. 30 allows for a substantially straight travel path of the windrower. FIG. 31 is a top view of the system 300 in a high speed road operation and in a left turn maneuver. The steering cylinder 340 is fully extended which, in turn, controls the retracted and locked caster cylinders 328, 330 to rotate the casters 304, 306.

Figure 32:
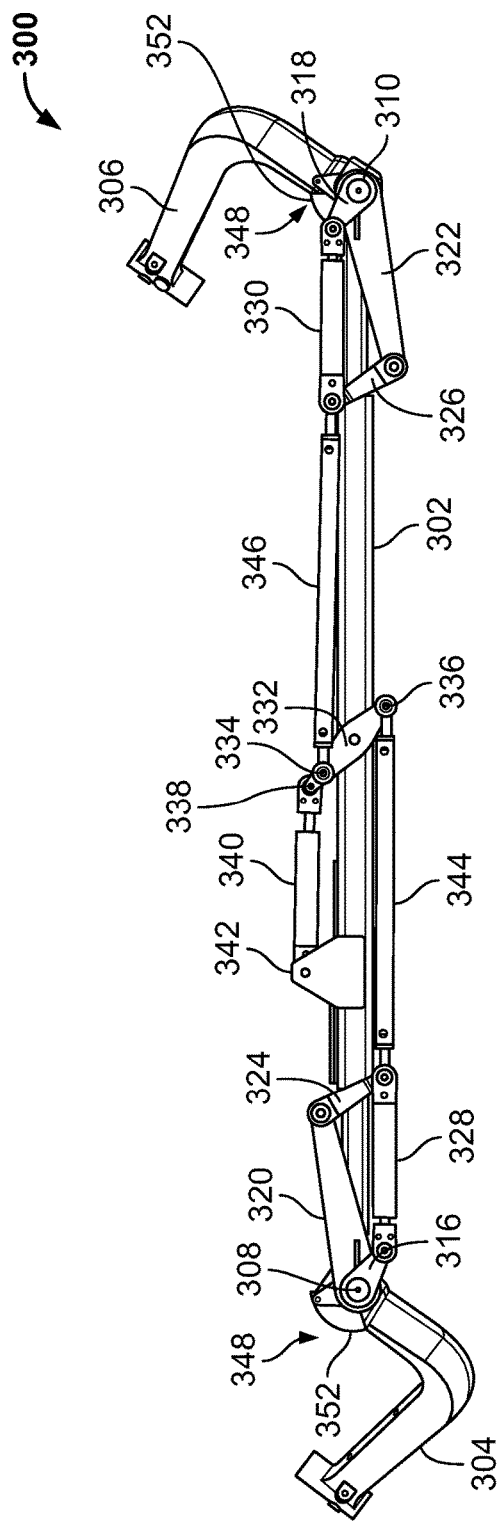
FIG. 32 is a top view of an exemplary rear axle steering system in a high speed road operation and in a right turn maneuver.
Figure 33:
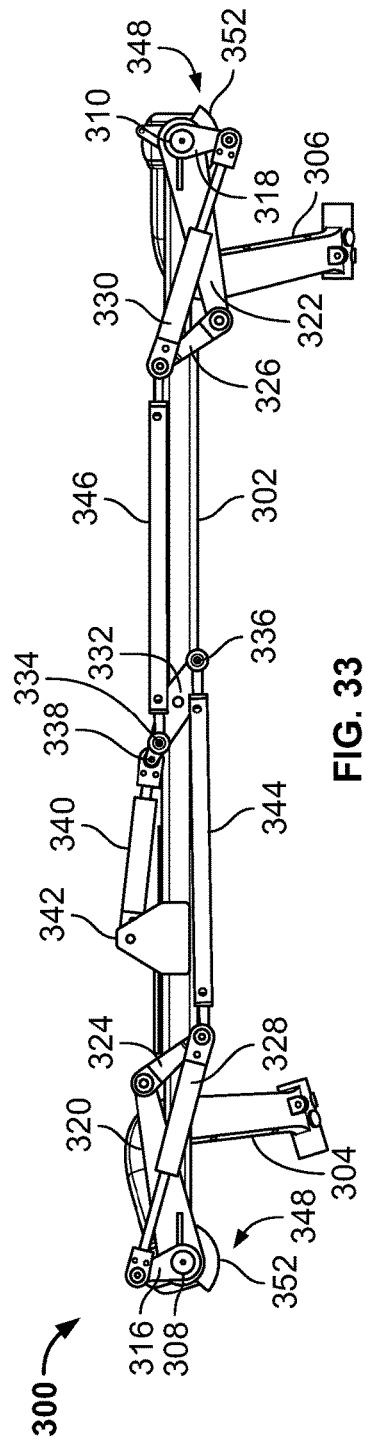
FIG. 33 is a top view of an exemplary rear axle steering system in a dual path operation and in a reversing maneuver.

FIG. 32 is a top view of the system 300 in a high speed road operation and in a right turn maneuver. The steering cylinder 340 is partially retracted (enough to make the right-hand turn but not entering the home position) and the caster cylinders 328, 330 are retracted and locked to rotate the casters 304, 306. FIG. 33 is a top view of the system 300 in a dual path operation and in a reverse maneuver. The steering cylinder 340 is retracted and the caster cylinders 328, 330 are open to tank to allow free rotation of the casters 304, 306.

Figure 34:
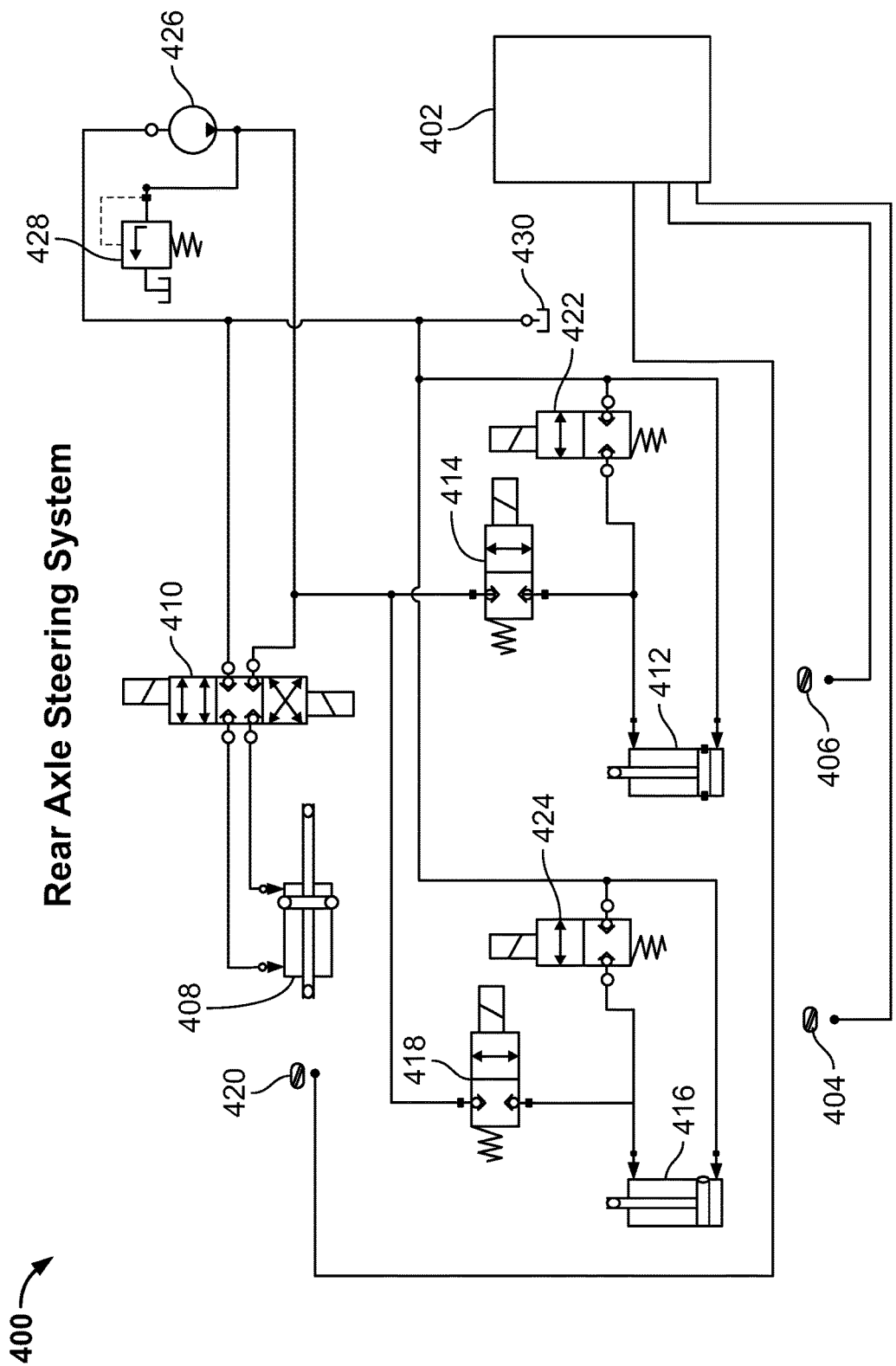
FIG. 34 is a static image of a hydraulic circuit of an exemplary rear axle steering system of the present disclosure.

FIG. 34 is a static image of a hydraulic circuit 400 for the system 300. The hydraulic circuit 400 includes a controller 402, a left-hand side caster proximity sensor 404, and a right-hand side caster proximity sensor 406. The hydraulic circuit 400 includes steering cylinder 408 and a steering directional valve 410. The hydraulic circuit 400 includes right-hand side caster cylinder 412 with a right-hand side caster cylinder control valve 414, and a left-hand side caster cylinder 416 with a left-hand side caster cylinder control valve 418. The hydraulic circuit 400 includes a steering cylinder linear sensor 420 (or any type of linkage position sensing mechanism). The hydraulic circuit 400 includes blocking valves 422, 424 for the right and left-hand sides, a pump 426, a relief valve 428, and tank 430. Although the caster cylinder blocking valves 422, 424 are shown as normally closed, it should be understood that in some embodiments, the caster cylinder blocking valves 422, 424 can be normally open.

Figure 35:
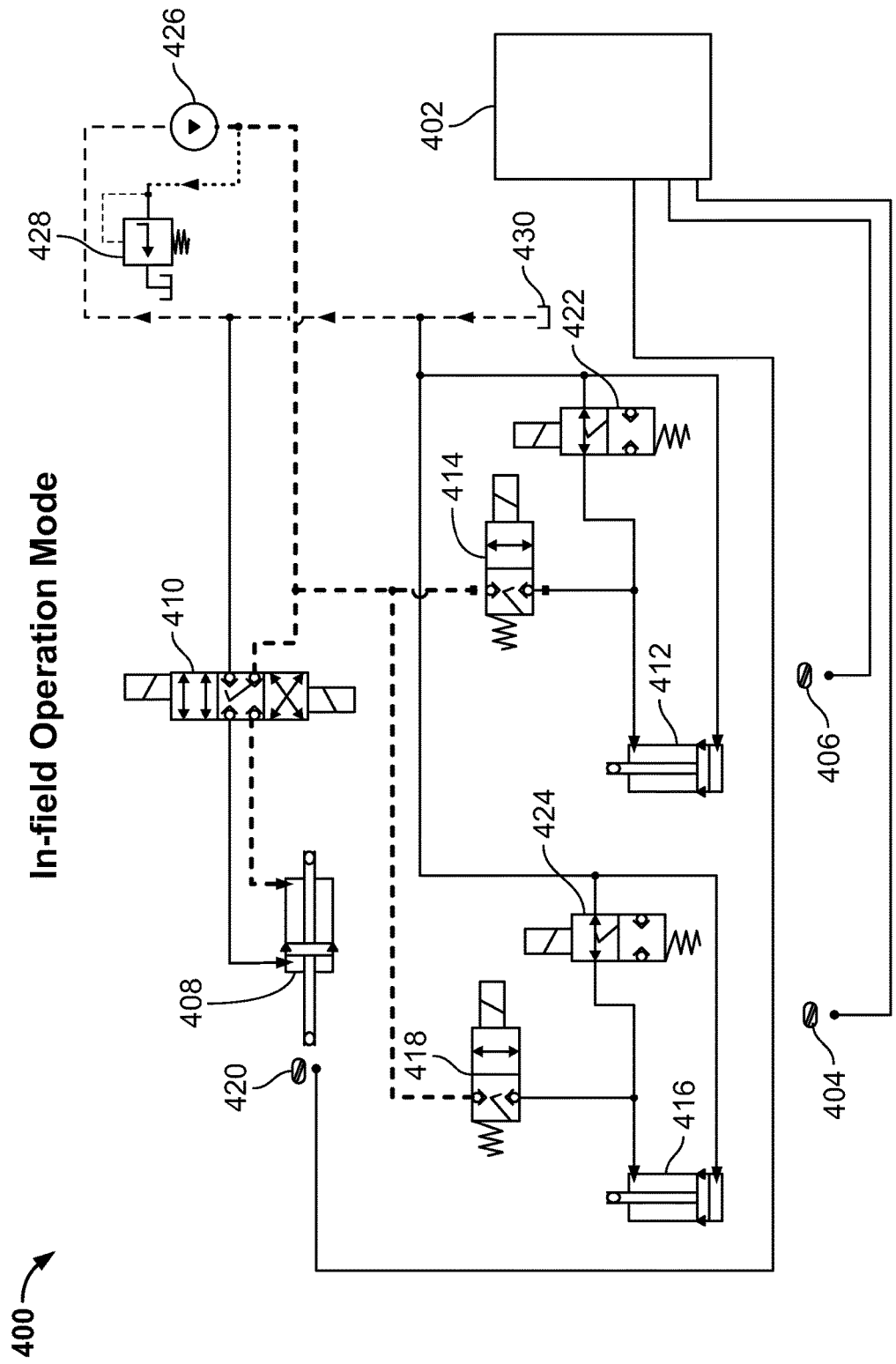
FIG. 35 is the hydraulic circuit of FIG. 34 in an in-field operation mode.
Figure 36:
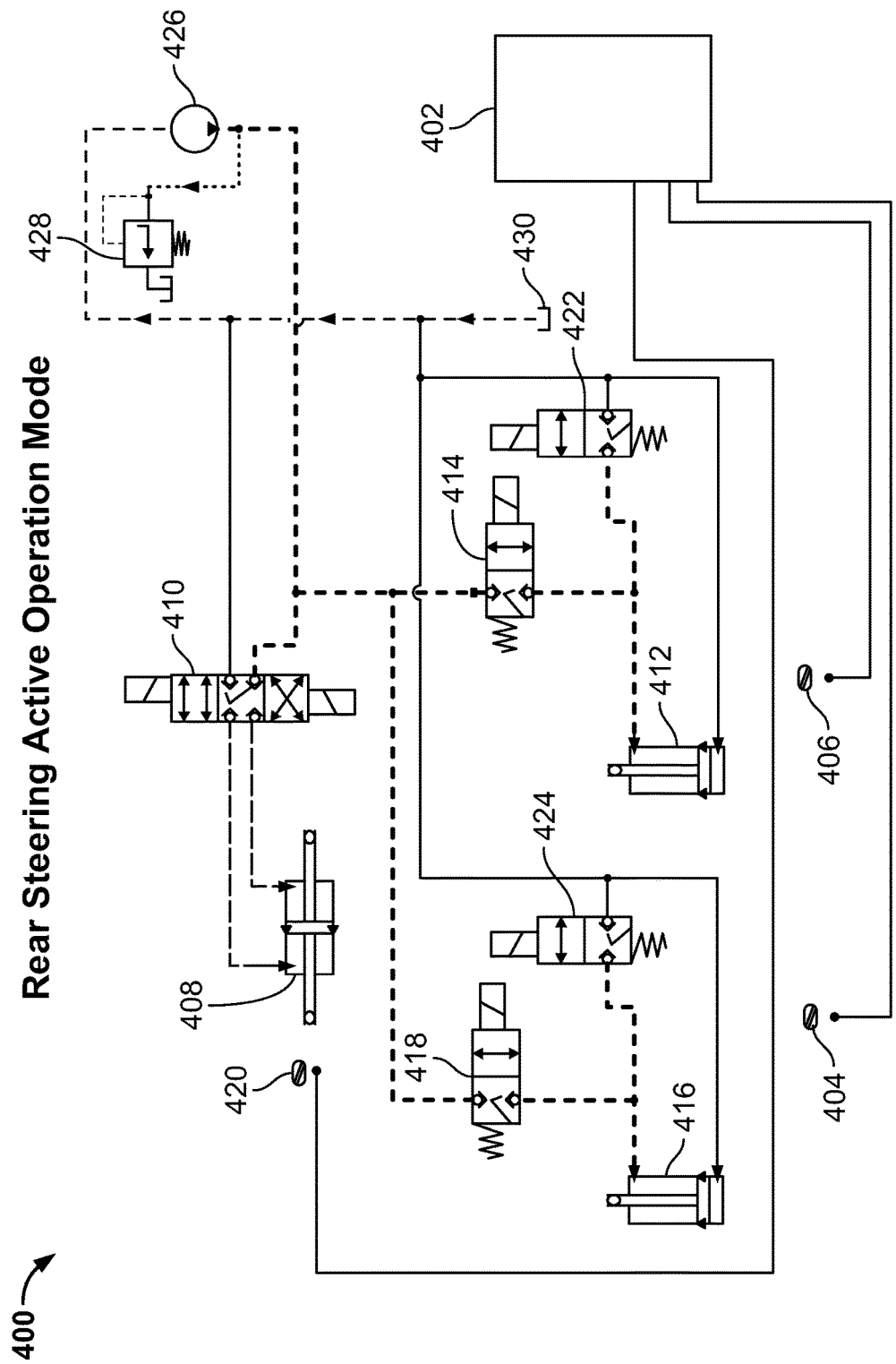
FIG. 36 is the hydraulic circuit of FIG. 34 in a rear steering, high speed road operation mode.

FIG. 35 is the hydraulic circuit 400 in an in-field operation mode. The steering cylinder 408 is actuated into a fully retracted and locked position. Both caster cylinders 412, 416 are open to tank 430 allowing the casters to freely pivot with caster cylinders as the shimmy dampers. FIG. 36 is the hydraulic circuit 400 in a high speed road operation mode. Both caster cylinders 412, 416 are fully retracted and locked, making the steering arm a rigid body and allowing the steering cylinder 408 to control the casters. The steering cylinder directional valve 410 is controlling the steering cylinder 408 based on the steering wheel position. The controller does not allow the steering cylinder 408 to enter the stowed position.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A steering system for a harvester, comprising:
   a single steering cylinder configured to be mounted to a rear axle of the harvester, the steering cylinder comprising first and second opposing ends;
   a right-hand side steering arm rotatably coupled at one end to a right-hand side caster cylinder, and rotatably coupled at an opposing end to a first tie rod, the first tie rod coupling the right-hand side steering arm with the first end of the steering cylinder, and the right-hand side caster cylinder coupling the right-hand side steering arm to a pivot shaft of a right-hand side caster;
   a left-hand side steering arm rotatably coupled at one end to a left-hand side caster cylinder, and rotatably coupled at an opposing end to a second tie rod, the second tie rod coupling the left-hand side steering arm with the second end of the steering cylinder, and the left-hand side caster cylinder coupling the left-hand side steering arm to a pivot shaft of a left-hand side caster;
   wherein in a road operation mode, the left and right-hand side cylinders are configured to retract and lock in a retracted position, and actuation of the steering cylinder regulates rotation of the left and right-hand side casters.

2. The steering system of claim 1, wherein the right-hand side steering arm pivots about a shaft coupled to a mounting bracket extending from the pivot shaft of the right-hand side caster.

3. The steering system of claim 2, wherein an axis of rotation of the pivot point of the right-hand side steering arm is offset from an axis of rotation of the pivot shaft of the right-hand side caster.

4. The steering system of claim 1, wherein the right-hand side caster cylinder is rotatably coupled to the pivot shaft of the right-hand side caster with a crank arm.

5. The steering system of claim 1, wherein in the road operation mode, the left and right-hand side cylinders operate as rigid steering links receiving actuation from the steering cylinder.

6. The steering system of claim 1, wherein in the road operation mode, extension of the steering cylinder is limited to an amount below a full extension position.

7. The steering system of claim 1, wherein in an in-field operation mode, the steering cylinder is configured to retract and lock in a retracted position, and the left and right-hand side cylinders are actuated to open to tank.

8. The steering system of claim 7, wherein in the in-field operation mode, the left and right-hand side casters freely pivot with shimmy damping provided by the left and right-hand side cylinders.

9. The steering system of claim 1, wherein the steering cylinder is centrally mounted to the rear axle of the harvester.

10. The steering system of claim 1, wherein the left and right-hand side steering arms are L-shaped or boomerang-shaped.

11. The steering system of claim 1, comprising a proximity sensor configured to detect a position of at least one of the left-hand side caster or the right-hand side caster relative to the rear axle.

12. The steering system of claim 11, wherein the proximity sensor comprises a fixedly mounted sensing element and a sensor plate rotatable with the left-hand side caster or the right-hand side caster.

13. The steering system of claim 12, wherein the sensing element is a magnetic element configured to detect a proximity of the sensor plate.

14. A harvester, comprising:
   a frame;
   at least one front axle comprising first and second front wheels pivotally mounted to the front axle;
   at least one rear axle comprising right-hand and left-hand casters pivotally mounted to the rear axle; and
   a steering system comprising:
     a single steering cylinder configured to be mounted to the rear axle of the harvester, the steering cylinder comprising first and second opposing ends;
     a right-hand side steering arm rotatably coupled at one end to a right-hand side caster cylinder, and rotatably coupled at an opposing end to a first tie rod, the first tie rod coupling the right-hand side steering arm with the first end of the steering cylinder, and the right-hand side caster cylinder coupling the right-hand side steering arm to a pivot shaft of the right-hand side caster;
     a left-hand side steering arm rotatably coupled at one end to a left-hand side caster cylinder, and rotatably coupled at an opposing end to a second tie rod, the second tie rod coupling the left-hand side steering arm with the second end of the steering cylinder, and the left-hand side caster cylinder coupling the left-hand side steering arm to a pivot shaft of the left-hand side caster;
     wherein in a road operation mode, the left and right-hand side cylinders are configured to retract and lock in a retracted position, and actuation of the steering cylinder regulates rotation of the left and right-hand side casters.

15. The harvester of claim 14, wherein the right-hand side steering arm pivots about a shaft coupled to a mounting bracket extending from the pivot shaft of the right-hand side caster.

16. The harvester of claim 15, wherein an axis of rotation of the pivot point of the right-hand side steering arm is offset from an axis of rotation of the pivot shaft of the right-hand side caster.

17. The harvester of claim 14, wherein in the road operation mode, the left and right-hand side cylinders operate as rigid steering links receiving actuation from the steering cylinder.

18. The harvester of claim 14, wherein in the road operation mode, extension of the steering cylinder is limited to an amount below a full extension position.

19. The harvester of claim 14, wherein in an in-field operation mode, the steering cylinder is configured to retract and lock in a retracted position, and the left and right-hand side cylinders are actuated to open to tank.

20. The harvester of claim 19, wherein in the in-field operation mode, the left and right-hand side casters freely pivot with shimmy damping provided by the left and right-hand side cylinders.

21. The harvester of claim 14, comprising a proximity sensor configured to detect a position of at least one of the left-hand side caster or the right-hand side caster relative to the rear axle.

\* \* \* \* \*